US012706951B2

(12) United States Patent
Chen et al.

(10) Patent No.: US 12,706,951 B2
(45) Date of Patent: Aug. 11, 2026

(54) DETECTION OF SQUATTING DOMAINS WITH INTENTIONALLY SUBSTITUTED KEYWORDS

(71) Applicant: Palo Alto Networks, Inc., Santa Clara, CA (US)

(72) Inventors: Zhanhao Chen, Sunnyvale, CA (US); Daiping Liu, Sunnyvale, CA (US); Fan Fei, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 19/039,527

(22) Filed: Jan. 28, 2025

(65) Prior Publication Data

US 2026/0222444 A1 Jul. 30, 2026

(51) Int. Cl.

| | |
|---|---|
| ***H04L 61/2521*** | (2022.01) |
| ***H04L 9/40*** | (2022.01) |
| ***H04L 61/30*** | (2022.01) |
| *H04L 61/2503* | (2022.01) |
| *H04L 61/4511* | (2022.01) |

(52) U.S. Cl.
CPC ................................ *H04L 63/1483* (2013.01)

(58) Field of Classification Search
None
See application file for complete search history.

(56) References Cited

U.S. PATENT DOCUMENTS

| | | | | |
|---|---|---|---|---|
| 11,178,175 | B2 * | 11/2021 | Kitahara | H04L 63/1441 |
| 2008/0250159 | A1 * | 10/2008 | Wang | H04L 61/30 709/239 |
| 2018/0139235 | A1 * | 5/2018 | Desai | H04L 63/1483 |
| 2020/0394497 | A1 * | 12/2020 | Loyola | H04L 63/1483 |
| 2022/0200941 | A1 * | 6/2022 | Lancioni | G06F 40/242 |
| 2022/0201036 | A1 * | 6/2022 | Nabeel | H04L 63/1425 |
| 2022/0377107 | A1 * | 11/2022 | Lee | H04L 63/1483 |
| 2023/0273996 | A1 * | 8/2023 | Hoole | G06F 21/566 726/23 |

FOREIGN PATENT DOCUMENTS

| | | | |
|---|---|---|---|
| CN | 115314236 A * | 11/2022 | H04L 61/4511 |

OTHER PUBLICATIONS

Chiba et al. "DomainLynx: Leveraging Large Language Models for Enhanced Domain Squatting Detection." In 2025 IEEE 22nd Consumer Communications & Networking Conference (CCNC), pp. 1-10. IEEE. Feb. 14, 2025.

Koide et al. "PhishReplicant: a Language Model-based Approach to Detect Generated Squatting Domain Names." In Proceedings of the 39th Annual Computer Security Applications Conference, pp. 1-13. Dec. 4, 2023.

(Continued)

*Primary Examiner* — Venkat Perungavoor

(74) *Attorney, Agent, or Firm* — Van Pelt, Yi & James LLP

(57) ABSTRACT

The present application discloses a method, system, and computer system for detecting domain squatting. The method includes (i) detect a domain squatting based at least in part on determining one or more substituted keywords based on input domains and seed domains to generate a plurality of potential squatting domains; and (ii) perform an action in response to detecting the domain squatting based at least in part on the one or more substituted keywords.

25 Claims, 14 Drawing Sheets

(56) References Cited

OTHER PUBLICATIONS

Nikiforakis et al. "Soundsquatting: Uncovering the use of homophones in domain squatting." In International Conference on Information Security, pp. 291-308. Cham: Springer International Publishing. 2014.

Wang et al. "Strider Typo-Patrol: Discovery and Analysis of Systematic Typo-Squatting." SRUTI 6, No. 31-36 (2006): 2-2. 2006.

Zeng et al. "Winding Path: Characterizing the Malicious Redirection in Squatting Domain Names." In International Conference on Passive and Active Network Measurement, pp. 93-107. Cham: Springer International Publishing. Mar. 30, 2021.

* cited by examiner

600

800

DETECTION OF SQUATTING DOMAINS WITH INTENTIONALLY SUBSTITUTED KEYWORDS

BACKGROUND OF THE INVENTION

Domain squatting, also known as cybersquatting, is a persistent cybersecurity challenge in which attackers register or use domain names that are confusingly similar to legitimate domains. These squatting domains are often employed for phishing, brand impersonation, malware distribution, or other malicious activities. Current systems for detecting domain squatting rely on a variety of approaches, ranging from manual monitoring to automated tools, each with limitations in scalability, accuracy, and adaptability to evolving threats.

BRIEF DESCRIPTION OF THE DRAWINGS

Various embodiments of the invention are disclosed in the following detailed description and the accompanying drawings.

DETAILED DESCRIPTION

Figure 1:
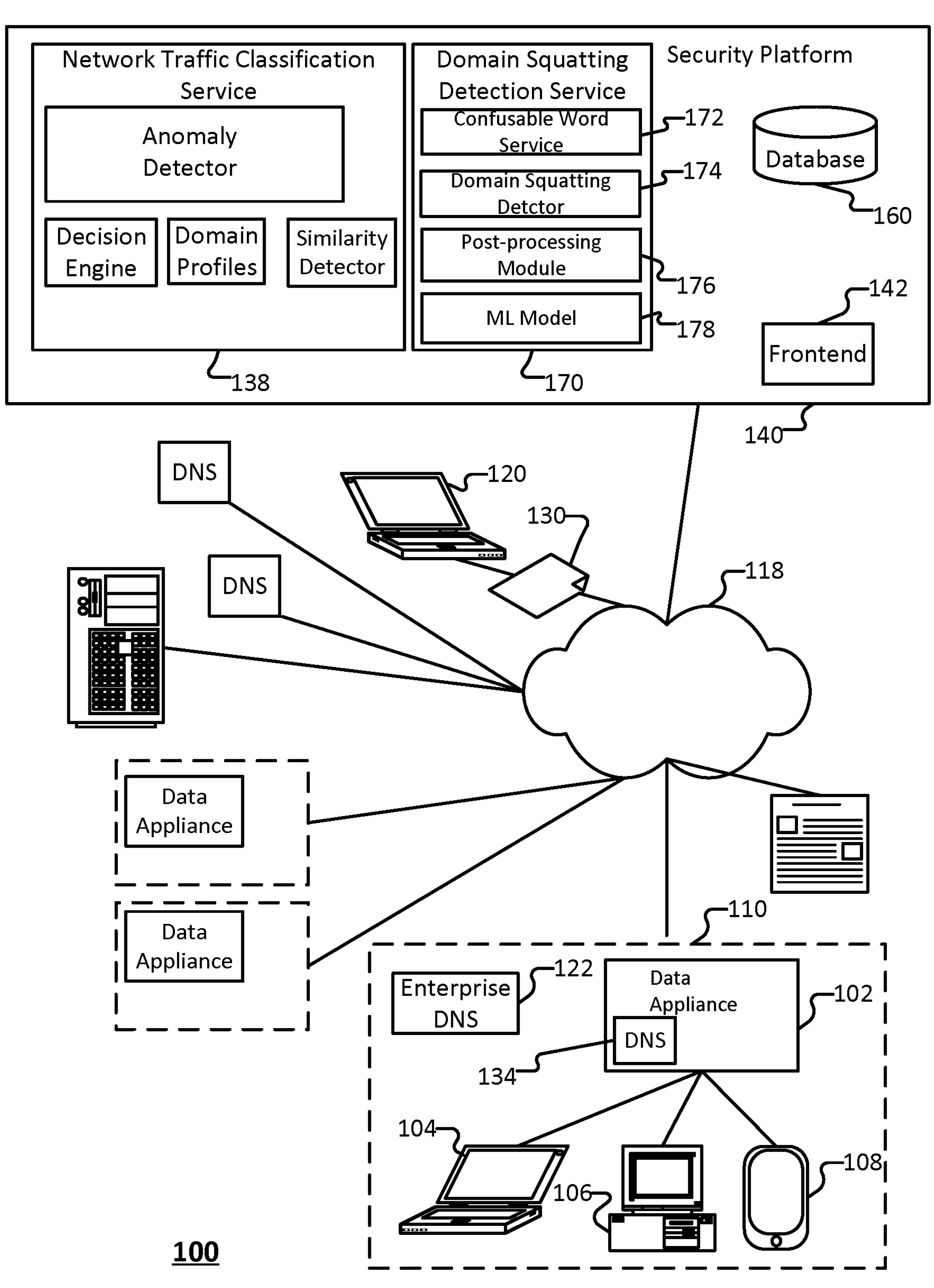
FIG. 1 is a block diagram of an environment for providing a security service to a network according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a security entity may be a network node (e.g., a device) that enforces one or more security policies with respect to information such as network traffic, files, etc. As an example, a security entity may be a firewall such as a next generation firewall. As another example, a security entity may be implemented as a router, a switch, a DNS resolver, a computer, a tablet, a laptop, a smartphone, etc. Various other devices may be implemented as a security entity. As another example, a security may be implemented as an application running on a device, such as an anti-malware application.

As used herein, a model includes a machine learning model and/or a deep learning model. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, a model is a large language model.

Users on the internet rely on domain names to find brands, services, professional and personal websites. Cybercriminals take advantage of the essential role that domain names play on the internet by registering names that appear related to existing domains or brands, with the intent of profiting from user mistakes. This is known as cybersquatting. Most domain squatting techniques leverage character-based variants such as typosquatting and bitsquatting. Besides these basic squatting, there are advanced techniques that abuse keyword-based similarity. For example, some attackers intentionally substitute keywords in the target domains with their homophones or semantically related words to generate the squatting domains for malicious purposes.

One technique for detecting domain squatting involves rule-based systems that detect squatting domains by applying predefined patterns or heuristics. For example, these systems may identify typographical errors in domain names, such as character substitutions, transpositions, or omissions. Although effective for detecting simple typosquatting, these techniques struggle with more sophisticated forms of domain abuse, such as homoglyph attacks, where visually similar characters (e.g., "0" and "O") are substituted, or compound squatting, where unrelated but contextually confusing words are added to legitimate domain names.

Another technique for detecting domain squatting is to monitor domain registrations in real-time, leveraging publicly available domain registration data such as WHOIS records. These systems attempt to match newly registered domains against a list of protected or high-value domains. However, this method often generates significant false positives, as legitimate defensive registrations by domain owners or unrelated domains with overlapping keywords can be flagged incorrectly. Additionally, reliance on WHOIS data is increasingly limited due to privacy restrictions, such as those imposed by the GDPR, which often mask registrant details.

Machine learning models have been introduced to address some of these limitations. These models are trained on features of known squatting and legitimate domains, enabling them to classify new domains based on learned patterns. However, many of these models rely on static training data and lack the ability to adapt dynamically to emerging domain squatting techniques. They also often require extensive computational resources and large labeled datasets for effective training, which can make implementation costly and less accessible for smaller organizations.

Another key challenge in related art systems is the inability to identify sophisticated domain squatting strategies that exploit semantic confusion. For instance, squatting domains may use synonyms, abbreviations, or related keywords that are not easily detectable using traditional techniques. These methods often require deeper contextual understanding of the domain names and their underlying semantics, something related art systems are not well-equipped to handle.

In practice, related systems often rely on a combination of the foregoing techniques, supplemented by human analysts who review flagged domains for accuracy. However, this hybrid approach is time-consuming, resource-intensive, and still prone to errors. As attackers continually develop more complex and subtle squatting strategies, the need for more intelligent, dynamic, and scalable detection systems has become evident. Various embodiments address these limitations by leveraging machine learning techniques, semantic analysis, and efficient data structures like tries to provide a robust and adaptive solution for detecting domain squatting.

Soundsquatting domains take advantage of homophones, for example, words that sound alike (e.g., weather and whether). Malicious actors can register homophone variants of popular domains, such as 4ever21[.] com for forever21[.] com. As text-to-speech software like Siri and Google Assistant becomes prevalent, more and more users will become vulnerable to the abuse of soundsquatting domains.

Semantic squatting domains leverage the semantic similarity between words such as synonyms or related words. One real-world example is a supply chain attack that created a fake Python mirror domain pypihosted[.] org mimicking the official one pythonhosted[.] org. By replacing the PyPi mirror URL in the supply chain's dependency file, the malicious actor successfully spread malware through the squatting domain widely and stealthily. In this case, the attacker uses the semantic related word 'pipy' of 'python' to generate the malicious domain, which makes the domain look like a legitimate host.

Various embodiments provide a system and method for detecting squatting domains, a critical capability in mitigating cybersecurity threats related to domain name abuse. The techniques described herein with respect to various embodiments leverage machine learning models and computational techniques to identify domains that mimic or are confusable with legitimate domains, either to deceive users or to exploit intellectual property.

The system begins by obtaining a set of seed domains, which may include popular domains, customer-specific domains, or other monitored domains. These seed domains can be predefined based on the security needs of the system's users or customers. In some embodiments, the set of seed includes a set of popular domains, such as the top 1000 most popular domains, or another list of popular domains managed/provided by a third-party service, for example.

The system generates a representation of the seed domains using a data structure, such as a trie (referred to as a seed trie), and populates a substitution keyword dictionary. In some embodiments, the substitution keyword dictionary is populated through a process involving two machine learning models (e.g., a first machine learning model and a second machine learning model). The first machine model extracts a set of meaningful keywords from the domain names in the set of seed domains, and the second model identifies confusable words for that set of meaningful keywords. These confusable words are stored in the substitution keyword dictionary. Notably, the first and second models may be implemented using the same large language model (LLM) in some embodiments, optimizing computational efficiency and accuracy.

When deployed, the system can detect squatting domains by analyzing domains associated with incoming/egressing network traffic, which may be intercepted by security entities such as firewalls or submitted as input for analysis. Upon receiving an input domain, the system extracts its domain name, identifies meaningful keywords using the first machine learning model, and retrieves corresponding confusable words from the substitution dictionary. If additional confusable words are needed, the second machine learning model may be queried dynamically for additional keywords pertaining to the meaningful keywords extracted from the domain name (e.g., in the case that the substitution dictionary does not comprise a set of confusable words for a particular meaningful keyword, or to improve the accuracy of the system based on an administrator configuration). Using these confusable words, the system generates a set of domain variants and compares them against the seed trie. If the input domain or its variants match an entry in the seed trie, the system flags the domain as a potential squatting domain.

In some embodiments, to improve accuracy and reduce false positives, the system incorporates a post-processing mechanism. In the post-processing mechanism compares attributes of the flagged domain (e.g., the potential squatting domain) with those of the legitimate seed domain. Examples of the attributes of the flagged domain compared with those of the legitimate seed domain includes information such as registrant, WHOIS data, or DNS records, pDNS records, or information obtained from WHOIS data, DNS records, or pDNS records. If certain attributes match, the flagged domain may be identified as a defensive registration by the legitimate domain owner rather than a malicious squatting attempt. If no match is found, the domain is classified as a squatting domain.

Upon detecting a squatting domain, the system can implement active measures to mitigate associated risks. These measures may include blocking traffic to or from the domain, preventing DNS resolution for the domain, or actively notifying domain registrars or authorities to suspend the domain. Other potential active measures might include initiating takedown requests, notifying the legitimate domain owner, redirecting users attempting to access the squatting domain to a warning page, or monitoring the squatting domain's activities for forensic purposes.

According to various embodiments, the system determines variants of an input domain by generating a set of confusable domain names that closely resemble the original domain. These confusable variants can be derived using a combination of machine learning models, including large language models (LLMs), and/or a pre-populated substitution keyword dictionary. This technique can be implemented to identify potential squatting domains that rely on typographical errors, visual similarities, or semantic confusion to deceive users or impersonate legitimate domains.

When the system receives an input domain, it first extracts the domain name, stripping any subdomains or top-level domains (e.g., converting "www.example.com" into "example"). The domain may be received based on the domain being extracted from intercepted traffic, such as DNS traffic. The system extracts the domain name and analyzes extracted domain name to identify meaningful keywords within the domain name. In some embodiments, identifying a set of meaningful keywords within the domain name is performed by querying a machine learning model, such as an LLM, trained to understand linguistic patterns and extract semantically significant words. For example, the domain "technewsdaily.com" might yield the meaningful keywords "tech," "news," and "daily."

Once the meaningful keywords are identified, the system generates a set of confusable words for each meaningful keyword. The confusable words can be obtained based on querying a machine learning model (e.g., which may be implanted as an LLM), and/or performing a lookup in a predefined substitution keyword dictionary. An LLM implemented to generate a set of confusable words may be the same as the LLM used to identify the set of meaningful keywords. The machine learning model leverages its extensive knowledge of language and contextual similarity to propose words that are visually, phonetically, and/or semantically similar to the original keywords. For instance, the keyword "tech" might yield confusable words such as "tek," "teh," or "techh," while "news" might produce "newz" or "nuws." These confusable words are stored in or retrieved from the substitution keyword dictionary, which serves as a repository of previously identified substitutions to enhance efficiency.

In some embodiments, the same LLM can perform both the extraction of meaningful keywords and the generation of confusable words. As an example, the LLM may be a generic pre-trained model, such as Chat GPT-4, Claude, Gemini, Llama, Grok, etc. By using contextual analysis, the LLM ensures that the generated confusable words are relevant and plausible, increasing the likelihood of capturing sophisticated squatting attempts. Additionally, the system may dynamically update the substitution keyword dictionary by supplementing it with new confusable words generated during the analysis of an input domain.

Using the meaningful keywords and their confusable counterparts, the system constructs variants of the input domain by systematically replacing the original meaningful keywords with their confusable alternatives. For example, given the domain "technewsdaily.com" and the confusable words generated for its keywords, the system might produce variants such as "teknewsdaily.com," "technewzdaily.com," or "technewzdaily.net." This process results in a comprehensive set of domain name variants that simulate potential squatting attempts.

The generated variants are then compared against the set of seed domains. In some embodiments, the generated variants are then compared against the seed trie, a data structure representing the legitimate seed domains, to determine whether any of the variants match an existing seed domain. If a match is found, the system flags the input domain as a potential squatting domain. By leveraging LLMs to generate confusable words and systematically creating domain variants, the system ensures thorough and adaptive detection of domain squatting activities, even in cases where attackers employ subtle or contextually deceptive tactics.

The system implementing techniques described herein can capture advanced domain squatting cases that leverage keyword-based lexical similarity. For example, the system provides new coverage compared to the traditional squatting detection techniques that focus on capturing character-based similarity. The system leverages an LLM to extract meaningful keywords and generate their siblings so it can capture comprehensive and update-to-date confusable word pairs from different perspectives.

An illustrative example of a domain squatting cases detected using the techniques described herein include pypihosted[.] org for the domain pythonhosted[.] org. Because "python" and "pypi" are not lexically similar, the system uses the more advanced mechanism to capture these related word pairs. For example, the system uses additional context to correlate the lexically dissimilar "python" and "pypi".

The system implementing techniques described herein is efficient in performing domain squatting detections. The system leverages trie data structure to store the seed domains and match the candidate domains. The trie traversal significantly reduces time complexity to find a match from a lot of seed domains. The time complexity of this system is O (biggest length of seeds), which will not scale as the number of seed domains increases. In addition, most trie traversals will stop at the early stage (e.g., upon detecting that a branch does not include any matching domains) so it can further reduce the execution time.

The system implementing techniques described herein provides a high precision domain squatting detections: The system can implement a post filtering module/technique to recognize the defensive registration with domain profiles including WHOIS and passive DNS records. For example, the system leverages complementary information to select out the squatting domains accurately.

FIG. 1 is a block diagram of an environment for providing a security service to a network according to various embodiments. In some embodiments, system 100 implements at least part of system 200 of FIG. 2 and/or seed trie 300 of FIG. 3. System 100 can implement one or more of processes 500-1300 of FIGS. 5-13.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains, DNS hijacked domains, stockpiled domains, or squatting domains, or such as traffic for certain applications (e.g., SaaS applications). In some embodiments, data appliance 102 is also configured to enforce policies with respect to traffic that stays within (or from coming into) enterprise network 110. In some embodiments, data appliance 102 is a network edge device. For example, data appliance 102 can implement ION device functionality, security services (e.g., firewall functionality), etc.

Techniques described herein can be used in conjunction with a variety of platforms (e.g., desktops, mobile devices, gaming platforms, embedded systems, etc.) and/or a variety of types of applications (e.g., Android.ask files, iOS applications, Windows PE files, Adobe Acrobat PDF files, Microsoft Windows PE installers, etc.). In the example environment shown in FIG. 1, client devices 104-108 are endpoints, such as a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including classifying domains (e.g., predicting whether a domain is a malicious domain, etc.), classifying DNS response records (e.g., predicting whether a domain IP pair in a DNS response is a DNS hijacked record, etc.), classifying network traffic, classifying DNS traffic, providing a mapping of signatures to certain domains or DNS records (e.g., a DNS record for which a predicted likelihood that the record is a DNS hijacked record exceeds a predefined likelihood threshold, etc. a mapping of domains or DNS records to domain or DNS record data (e.g., domain certificates, pen's data, active DNS data, WHOIS data, etc.), performing static and dynamic analysis on malware samples, monitoring new domains and new DNS records (e.g., detecting new domains for which a certificate is issued/generated), assessing maliciousness of domains, determining whether a DNS record associated with a traffic sample is (or is likely to be) a DNS hijacked record, detecting squatting domains, providing a list of signatures of known exploits (e.g., malicious input strings, malicious files, malicious domains, etc.) to data appliances, such as data appliance 102 as part of a subscription, detecting exploits such as malicious input strings, malicious files, DNS hijacked records or malicious domains (e.g., an on-demand detection, or periodical-based updates to a mapping of domains or DNS records to indications of whether the domains or DNS records are malicious or benign), providing a likelihood that DNS traffic (e.g., a domain or DNS record comprised in the DNS traffic) is malicious or benign, providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, DNS records, or domains are malicious, providing an indication that an input string, file, DNS record, or domain is malicious (or benign), etc.

In some embodiments, squatting domain classification is implemented at data appliance 102. For example, data appliance 102 can store a classifier for performing squatting domain classification and detecting squatting domains based on the predicted classifications (e.g., based on the potential squatting domains obtained from the classifier). The classifier may be trained and/or updated by another system or service, such as by security platform 140. For example, security platform 140 can push an update to the classifier for local use by data appliance 102.

In some embodiments, squatting domain classification is implemented by one or more servers, such as a cloud service. For example, security platform 140 performs the DNS traffic classification. Security platform 140 (e.g., domain squatting detection service 170) can perform an offline classification, such as based on historical network traffic, for example, DNS traffic obtained from DNS traffic logs (e.g., DNS traffic logs stored locally at security entities or reported by the security entities to security platform). Security platform 140 can perform a real-time classification (e.g., contemporaneous with the interception/handling of the DNS traffic, etc.), such as based on receiving a query from an inline security entity (e.g., data appliance 102) for a classification.

In various embodiments, results of analysis (and additional information pertaining to applications, domains, etc.), such as an analysis or classification performed by security platform 140, are stored in database 160. Database 160 may additionally store a seed trie (e.g., generated by security platform 140) for a set of seed domains and/or a predefined substitution keyword dictionary. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+Gigabytes of RAM, and one or more Gigabit network interface adapters) that runs commercially available virtualization software, such as VMware Six, Citrix eServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remaining portions of security platform 140 provided by dedicated hardware owned by and under the control of the operator of security platform 140.

According to various embodiments, security platform 140 comprises/implements network traffic classification service 138 and/or domain squatting detection service 170. Security platform 140 may include various other services/modules, such as a malicious file detector, a malicious traffic detector, a parked domain detector, an application classifier or other traffic classifier, etc.

Network traffic classification service 138 is used in connection with analyzing network traffic (e.g., websites, domains, sample files, etc. pertaining to the network traffic) and/or automatically detecting malicious network traffic.

Domain squatting detection service 170 is used in connection with classifying input domains (e.g., domains extracted from intercepted network traffic) and/or detecting squatting domains. Domain squatting detection service 170 can perform an offline squatting domain classification, such as to determine predicted squatting domains based on historical log data, or real-time squatting domain classification in response to a query from another security entity (e.g., an inline firewall such as a next generation firewall). In some embodiments, domain squatting detection service 170 determines the squatting domain classifications based at least in part on identifying variants of the input domain (e.g., using a set of substitution keywords or predefined substitution keyword dictionary for keywords that may be confusable with keywords extracted from the domain name of the input domain). For example, Domain squatting detection service 170 profiles the DNS traffic time series data to obtain a DNS traffic profile representing the DNS traffic time series data. In response to obtaining the DNS traffic profile, Domain squatting detection service 170 queries a classifier for a predicted DNS traffic classification based on the DNS traffic profile.

In some embodiments, Domain squatting detection service 170 comprises one or more of confusable word service 172, domain squatting detector 174, post-processing module 176, and/or machine learning model (ML model) 178.

Domain squatting detection service 170 obtains domains to be classified (e.g., for which squatting domains detections is to be performed) from traffic logs (e.g., data logs stored at database 160 and/or data logs stored locally at security entities such as inline firewalls) or from queries for squatting domain classifications such as from inline security entities that are seeking a real-time squatting domain classification contemporaneous with the interception/handling of network traffic (e.g., DNS traffic).

Domain squatting detection service 170 uses confusable word service 172 to generate a set of confusable words for a set of meaningful keywords. In some embodiments, domain squatting detection service 170 uses confusable word service 172 to generate (or update) a substitution keyword dictionary that can be used to perform a lookup for a set of substitution keywords (e.g., confusable words) for a particular keyword (e.g., a meaningful keyword that has been extracted from a domain name for the domain to be classified). The substitution keyword dictionary may be predefined, such as by an offline service that identifies new keywords for which confusable words are to be determined, or that identifies new confusable words for particular keywords. In some embodiments, confusable word service 172 updates the substitution keyword dictionary based on a determination of a set of confusable words for a particular keywords, such as in connection with performing a squatting domain classification for an input domain and the domain name for the input domain comprising a meaningful word that is not comprised in the substitution keyword dictionary.

Domain squatting detection service 170 uses domain squatting detector 174 to detect potential squatting domains (e.g., to perform a squatting domain classification). Domain squatting detector 174 can perform the potential squatting domain detections offline, such as in connection with updating a whitelist (e.g., an allowlist) of benign or non-malicious domains, or a blacklist (e.g., a denylist) of malicious domains (e.g., squatting domains). Additionally or alternatively, domain squatting detector 174 can perform the potential squatting domain detections in real-time, such as based on a query from an inline security entity that requests a squatting domain classification contemporaneous with the inline security entity's handling of the corresponding network traffic.

Domain squatting detector 174 obtains a set of seed domains. The set of seed domains may include one or more of a set of popular domains, a set of customer-specific domains, or a set of other monitored domains. These seed domains can be predefined based on the security needs of the system's users or customers. In some embodiments, the set of seed includes a set of popular domains, such as the top 1000 most popular domains, or another list of popular domains managed/provided by a third-party service, for example. In some embodiments, domain squatting detector 174 generates a representation for the set of seed domains, such as a representation that enables the system to perform a quick look up to match a possible squatting domain with a seed domain. As an example, domains squatting detector 174 generates a trie based on the set of seed domains (e.g., the seed trie). The set of seed domains and/or the representation of the set of seed domains (e.g., the seed trie) may be stored in database 160.

Domain squatting detector 174 obtains an input domain (or a set of input domains) for which a squatting domain classification is to be performed. In some embodiments, the input domain is obtained based on a query from a security entity (e.g., an inline firewall) that had intercepted network traffic for the particular input domain. For example, the query may be a request for a real-time squatting domain classification to enable the security entity to handle the corresponding network traffic to/from or otherwise for the input domain. In some embodiments, the input domain is obtained from traffic logs, such as logs of network traffic across a monitored network. Domain squatting detector 174 may provide asynchronous or offline squatting domain classifications to enable the security entity to apply security policies with respect to the intercepted traffic based on the squatting domain classification(s). For example, domain squatting detector 174 can generate/update an allowlist of benign or non-malicious domains (e.g., domains that are not squatting domains) and/or a denylist of malicious domains (e.g., squatting domains).

In response to obtaining a particular input domain (or a set of input domains) for which a squatting domain classification is to be performed, domain squatting detector 174 obtains a set of meaningful keywords for the particular input domain. For example, domain squatting detector 174 obtains the domain name for the particular input domain, and extracts the set of meaningful keywords. In some embodiments, domain squatting detector 175 extracts the set of meaningful keywords based on querying ML model 178 based on the domain name. ML model 178 may comprise an LLM that is used to extract the set of meaningful keywords from the domain name of the particular input domain.

In response to obtaining the set of meaningful keywords, domain squatting detector 174 obtains (e.g., determines) a set of confusable words for one or more of the set of meaningful keywords. In some embodiments, domain squatting detector 174 obtains a set of confusable words for each meaningful word in the set of meaningful words for the input domain. As an example, domain squatting detector 174 can obtain the set of confusable words based on performing a lookup against the substitution keyword dictionary (e.g., the dictionary prepopulated with substitution keywords mapped to meaningful words). As an example, domain squatting detector 174 can obtain the set of confusable words based on querying ML model 178 (e.g., an LLM, such as the same LLM implemented to extract the set of meaningful keywords). In some embodiments, domain squatting detector 174 obtains the set of confusable words based on both the predefined substitution keyword dictionary and querying ML model 178.

In response to obtaining the set of confusable words, domain squatting detector 174 determines a set of variants of the domain name for the input domain. Domain squatting detector 174 determines various permutations and combinations of the set of confusable words for the set of meaningful keywords in the domain name for the input domain. In some embodiments, domain squatting detector 174 obtains the set of variants based at least in part on querying ML model 178 (e.g., an LLM comprised in ML model 178) for the set of variants. For example, domain squatting detector 175 queries the ML model 178 based at least in part on the set of meaningful keywords and the set of confusable words.

In some embodiments, ML model 178 comprises one or more machine learning models that may be trained according to a machine learning process. Examples of machine learning processes that can be implemented include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a neural network (NN), XGBoost, a convolutional neural network (CNN), a large language model (LLM), etc.

Domain squatting detector 174 determines whether the input domain(s) is a potential squatting domain based on a comparison of the set of variants of the input domain with the set of seed domains. For example, domain squatting detector 174 determines whether a variant of the input domain corresponds to (e.g., matches) a seed domain in the set of seed domains. In some embodiments, such as in cases when a seed trie has been populated for a set of seed domains, domain squatting detector 174 determines whether the input domain is a potential squatting domain based on traversing the seed trie for each variant in the set of variant to determine whether any of the variants match a seed domain in the set of seed domains. In response to determining that a variant matches a seed domain, domain squatting detector 174 can classify the input domain as a potential squatting domain. Conversely, in response to determining that no variant of the set of variants for the input domain matches a seed domain, domain squatting detector 174 can classify the input domain as a non-squatting domain.

Domain squatting detection service 170 uses post-processing module 176 to process the potential squatting domain detections generated by domain squatting detector 174. In some embodiments, domain squatting detection service 170 determines whether an input domain deemed to be potential squatting domain detections generated by domain squatting detector 174 is a defensive registration, such as a registration by or on behalf of the owner of (or entity associated with) the legitimate domain. Post-processing module 176 compares attributes of the potential squatting with those of the legitimate seed domain (e.g., the seed domain for which a variant of the input domain is deemed to match). Examples of the attributes of the flagged domain compared with those of the legitimate seed domain includes information such as registrant, WHOIS data, or DNS records, pDNS records, or information obtained from WHOIS data, DNS records, or pDNS records. If certain attributes match, the flagged domain may be identified as a defensive registration by the legitimate domain owner rather than a malicious squatting attempt (e.g., the potential squatting domain detection is deemed a false positive). If no match is found, post-processing module 176 classifies the domain is classified as a squatting domain (e.g., the potential squatting domain detection is deemed a true positive).

According to various embodiments, security platform 140 may receive a query from a security entity (e.g., inline firewall, such as a next generation firewall) for a real-time or offline classification of a network traffic sample, such as a file.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious domains, detecting parked domains, or otherwise determining that certain detected network traffic is to be further analyzed (e.g., using a finer detection model).

In some embodiments, security platform 140 comprises a network traffic classifier that provides to a security entity, such as data appliance 102, an indication of the traffic classification. For example, in response to detecting the C2 traffic, network traffic classifier sends an indication that the domain traffic corresponds to C2 traffic to data appliance 102, and the data appliance 102 may in turn enforce one or more policies (e.g., security policies) based at least in part on the indication. The one or more security policies may include isolating/quarantining the content (e.g., webpage content) for the domain, blocking access to the domain (e.g., blocking traffic for the domain), isolating/deleting the domain access request for the domain, ensuring that the domain is not resolved, alerting or prompting the user of the client device the maliciousness of the domain prior to the user viewing the webpage, blocking traffic to or from a particular node (e.g., a compromised device, such as a device that serves as a beacon in C2 communications), etc. As another example, in response to determining the application for the domain, the network traffic classifier provides to the security entity with an update of a mapping of signatures to applications (e.g., application identifiers).

Figure 2:
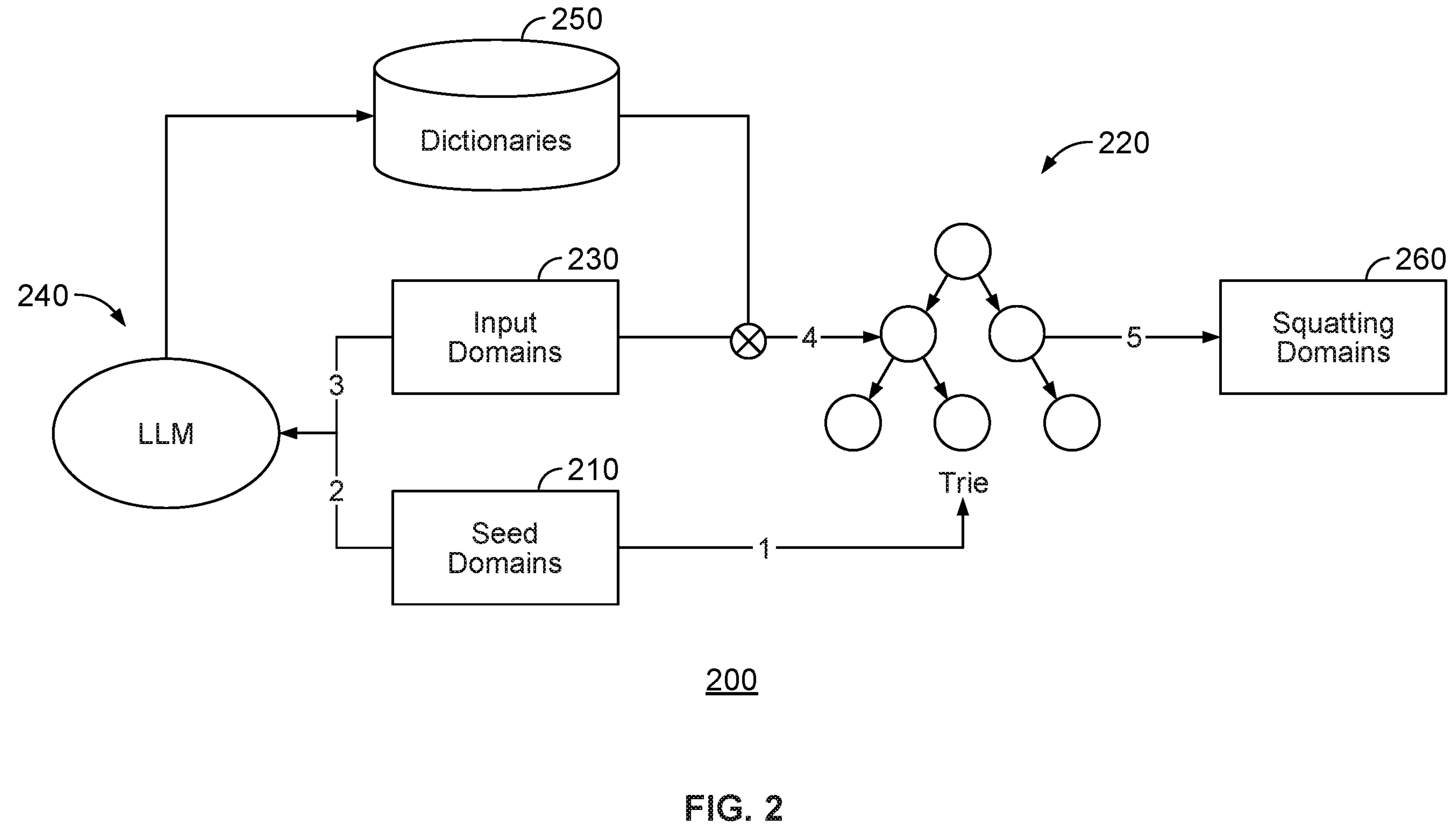
FIG. 2 is a block diagram of a system to perform squatting domain classifications according to various embodiments.

FIG. 2 is a block diagram of a system to perform squatting domain classifications according to various embodiments. In some embodiments, system 200 implements at least part of system 100 of FIG. 1 and/or seed trie 300 of FIG. 3. System 200 can implement one or more of processes 500-1300 of FIGS. 5-13.

Various embodiments provide a system, method, and device to detect keyword-based domain squatting efficiently.

As shown in FIG. 2, system 200 stores a set of seed domains 210. The set of seed domains may be predefined, such as based on an administrator input/configuration, a set of popular domains (e.g., a list provided by a third party service that evaluates domain popularity), a set of customer domains (e.g., the domains for a customer of a security service providing squatting domain detection), a set of other interested domains, etc.

System 200 can perform an initialization in which a seed trie 220 and a substitution keyword dictionary 250 is generated/updated. As shown, system 200 generates a seed trie 220, which is a trie representation of the set of seed domains. System 200 labels the nodes that represent the end of each seed (e.g., nodes 320 and 335 in seed trie 300 of FIG. 3) with the raw domain for quick retrieval. For example, given forever21[.] com and pythonhosted[.] org, system 200 generates seed trie 300 shown in FIG. 3.

System 200 leverages an LLM to generate the potential abused keyword relationship. System 200 extracts a set of meaningful words from the domain names of the set of seed domains (e.g., the domain names for each seed domain). For example, system 200 queries a first LLM for to extract a set of meaningful words for a particular seed domain. The extraction of meaningful words can be performed for each seed domain. System 200 then generates a set of confusable words based on the set of meaningful keywords extracted from the set of seed domains. In some embodiments, system 200 generates the set of confusable words based at least in part on querying a second LLM for a set of confusable words for the set of meaningful words (e.g., a set of confusable words for each of the extracted meaningful words).

In some embodiments, the first LLM and the second LLM are the same LLM. In various other embodiments, the first LLM and the second LLM may be different. For example, different pre-trained or specially-trained LLMs may perform differently in extracting meaningful keywords from domain names and generating a set of confusable words for a meaningful keyword.

In response to obtaining the set of confusable words for the set of meaningful words, system 200 stores the set of confusable words in substitution keyword dictionary 250. In some embodiments, substitution keyword dictionary 250 stores a mapping of meaningful keywords to a corresponding set of confusable words. Substitution keyword dictionary 250 can be queried to return confusable words for a particular meaningful keyword, etc.

Substitution keyword dictionary 250 may store one or more dictionaries to store various word relationships including homophones, synonyms and semantic related words. In some embodiments, one or more of these dictionaries can be implemented as hashmaps where a key is a word and the value is a list of the key's sibling words (e.g., a set of confusable words for the word stored in the key, or a substituted keyword). As an illustrative example, the homophone dictionary may comprise the mapping (e.g., key-value pair) '4'→ ['for']. As another example, the semantic related words dictionary may comprise the mapping (e.g., key-value pair) 'pip' →['python']. System can use these dictionaries (e.g., the hashmap dictionaries) to quickly retrieve a particular word's siblings (e.g., confusable words).

After system 200 has been initialized, system 200 may be deployed to perform squatting domain detection. To detect squatting domains, system 200 maintains a list of potential target domains, which can be popular and legitimate domains (e.g., forever21[.] com and pythonhosted[.] org). The domains in this list are the 'seeds' of domain squatting. System 200 can process input domains from various sources including newly registered domains, domains from passive DNS and any on-demand inputs. System 200 can evaluate an input domain and generate a squatting domain classification prediction (e.g., an indication of whether the input domain is deemed a squatting domain). System 200 can provide this squatting domain classification to another system, service, or method that invoked system 200. For example, the other system, service, or method can cause a security policy to be appropriately applied for network traffic associated with the particular input domain based on the corresponding squatting domain classification prediction.

During the detection stage, system 200 can apply the same keyword relationship discovery operations on the input domains, namely, extract meaningful keywords from corresponding domain names and produce sibling words (e.g., a set of confusable words) for the extracted meaningful keyword. According to various embodiments, system 200 obtains a set of input domains for which system 200 is to generate/determine a squatting domain classification. For each input domain evaluated, system 200 extracts the domain name and extracts a set of meaningful keywords from the domain name. System 200 can implement a machine learning model to extract the meaningful keywords in the domain name. For example, system 200 queries the first LLM for the set of meaningful keywords based on the domain name for a particular input domain. In response to extracting the set of meaningful keywords for a particular input domain, system 200 obtains a set of sibling words (e.g., confusable words) for one or more of the meaningful keywords in the set of meaningful keywords. For example, system 200 obtains a set of sibling words for each meaningful keyword in the set of meaningful keywords for the particular input domain.

In some embodiments, system 200 obtains the set of sibling words (e.g., confusable words) for one or more of the meaningful keywords in the set of meaningful keywords based at least in part on one or more of (i) querying a machine learning model to generate at least a subset of the set of sibling words (e.g., querying the second LLM), and (ii) performing a lookup against the substitution keyword dictionary 250 (e.g., the various hashmap dictionaries) based on the particular meaningful keywords. System 200 may determine the set of sibling words based on querying the substitution keyword dictionary 250 and without querying the machine learning model, such as in cases where the substitution keyword dictionary 250 comprises mappings for all meaningful words in the set of meaningful words extracted for the particular input domain. For meaningful keywords for which the substitution keyword dictionary 250 does not comprise a mapping of sibling words (e.g., confusable words), system 200 may query the machine learning model (e.g., the second LLM) to generate a set of confusable words for such meaningful keywords. System 200 may update the substitution keyword dictionary 250 to comprise mappings of newly found word relationships (e.g., based on the generated set of confusable words for meaningful keywords not previously stored in the substitution keyword dictionary 250). In some embodiments, system 200 queries the machine learning model for a set of confusable words even if the substitution keyword dictionary 250 stores a mapping to a set of confusable words for the particular meaningful keyword, such as to update the substitution keyword dictionary 250 based on drift in the meaning or usage of terms.

In response to obtaining the set of sibling words for the set of meaningful keywords for a particular input domain, system 200 determines a set of variants of the input domain based at least in part on the set of sibling words (e.g., a set of substituted keywords). For example, system 200 generates all variants of an input domain name by replacing any word in the domain name with its siblings. For example, given '4ever21', system 200 can retrieve the sibling, 'for', of '4' from the homophone dictionary to generate a variant forever21. In some embodiments, system 200 queries a machine learning model (e.g., an LLM) to generate the list of variants based at least in part on the input domain and the set of sibling words (e.g., the set of confusable words).

System 200 then performs a matching of the variants with the set of seed domains to determine whether any variant of the input domain matches a seed domain. In some embodiments, system 200 traverse each variant against the seed trie 220. The traversal checks each character of the given string one by one from the root until it reaches the end of the string or until it cannot find the child node for the next character. If the traversal ends in a node that represents a seed (e.g., a terminal node), system deems the corresponding input domain as a potential squatting domain for the seed domain.

System 200 can post-process the prediction of potential squatting domain to determine a squatting domain classification. For example, system 200 performs the post-processing to identify false positive detections, such as domains that may be legitimate defensive registrations (e.g., by or for the owner of the seed domain), and to identify true positive detections (e.g., domains that are predicted to be squatting domains).

Many trademark owners are continuously monitoring and preventing domain squatting abuses that target their legitimate domains. The trademark or domain owners may register or acquire their squatting domains to defend their brands/domains. To filter out the defensive registration, system 200 compares the profiles of squatting candidate domains and their matched seeds. In some embodiments, a domain's profile includes registrar and registrant information from WHOIS record (e.g., system 200 queries a third party service for the registrar and/or registrant information) and/or IP address and name server information from passive DNS data. If the candidate squatting domain (e.g., the identified potential squatting domain) shares any same attribute with the matched seed domain, system 200 deems the potential squatting domain prediction as a false positive and the prediction is filter it out (e.g., the squatting domain classification is that the domain is a benign domain or not a squatting domain). If the candidate squatting domain does not share any same attribute with the matched seed domain, system 200 deems the potential squatting domain prediction as a true positive and deems the corresponding input domain as a squatting domain.

Figure 3:
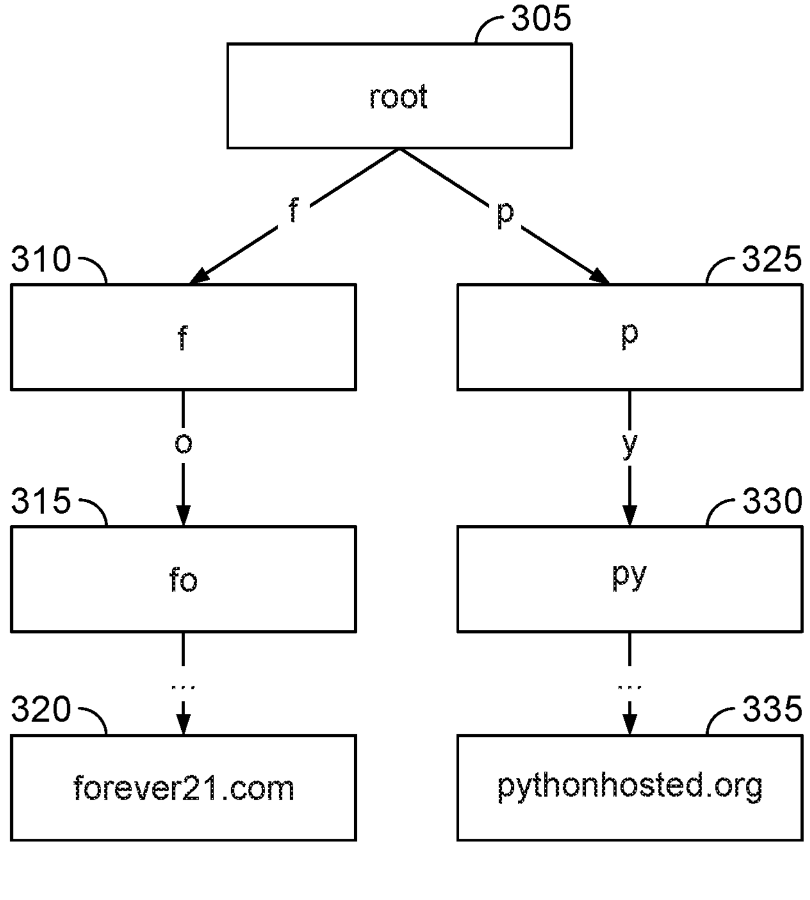
FIG. 3 is an example of a trie based on a set of seed domains according to various embodiments.

FIG. 3 is an example of a trie based on a set of seed domains according to various embodiments. In some embodiments, seed trie 300 is implemented at least in part by system 100 of FIG. 1 and/or system 200 of FIG. 2. Seed trie 300 may be implemented in connection with one or more of processes 500-1300 of FIG. 5-13.

A trie is a tree-like data structure optimized for storing and searching strings efficiently. It organizes strings hierarchically, where each node in the trie represents a single character, and a complete string is stored as a path from the root to a terminal node. Tries are particularly effective for applications that require prefix-based lookups, such as autocompletion or matching strings against a dataset. In various embodiments, a trie is implemented to represent a set of seed domains (e.g., a seed trie), enabling fast and efficient matching of input domains or their variants against the stored seed domains.

According to various embodiments, to generate a trie from a set of seed domains, the system begins by extracting the domain names from the seed set. For each domain name, the system inserts its characters into the trie one at a time, starting at the root node. If a character is already present in the current node's children, the system moves to that child node. If the character is not present, a new node is created for it, and the traversal continues. Once all characters of a domain name are inserted, the final node in the path is marked as a terminal node to signify the end of a valid domain name. This process is repeated for each seed domain in the set, resulting in a trie that compactly represents the full set of seed domains.

For example, consider the seed domains "example.com," "exam.net," and "exercise.org." When constructing the trie, the system first inserts "example.com" by creating nodes for each character in sequence: e→x→a→m→p→l→e→.→c o m. for "exam.net," the system reuses the shared prefix "exam" from the existing trie structure and branches out from there to add. →n→e→t. Finally, for "exercise.org," the prefix "ex" is reused, and the system adds the unique characters e →r→c→i→s→e→.→o→r→g. This hierarchical organization minimizes redundancy by sharing common prefixes among the domains.

The trie structure is highly efficient for lookups because it allows the system to follow a character-by-character traversal path defined by the input string. When checking whether a domain or its variant exists in the trie, the system starts at the root and traverses the trie, moving to the next node for each character in the domain name. If the traversal reaches a terminal node, the domain matches a seed domain. If a required character is missing at any point, the domain is not in the trie. This traversal has a worst-case time complexity of O (m), where m is the length of the input string, making it significantly faster than searching through a list of domains, which typically has a time complexity of O (n*m), where n is the number of domains in the list.

The trie's efficiency is further enhanced by its compact representation of shared prefixes, which reduces redundant storage of overlapping portions of domain names. For example, the shared prefix "exam" in the domains "example.com" and "exam.net" is stored only once in the trie, conserving memory and improving performance. This makes the trie particularly well-suited for scenarios where large sets of strings need to be stored and frequently queried.

In the context of detecting squatting domains, the trie (e.g., the seed trie) serves as a highly efficient mechanism to compare input domains and their confusable variants against the seed domains. Once the trie is constructed, the system can quickly check whether an input domain or any of its generated variants matches a seed domain. This enables real-time or near-real-time performance, even when the system is tasked with processing large numbers of input domains or operating in high-traffic environments. By combining the trie's efficient lookup capabilities with the generation of confusable domain variants, the system ensures robust and scalable detection of domain squatting activities.

In the example shown, the system generates seed trie 300 based on a set of seed domains comprising the domain names: "forever21.com" and "pythonhosted.org". Seed trie 300 comprises a root node 305 at which the trie traversal can begin. The system generates seed trie 300 so node 310 corresponding to "f" (e.g., for the branch corresponding to "forever21.com") and node 325 corresponding to "p" branch (e.g., for the branch corresponding to "pythonhosted.org") respectively branch from root node 305. For the branch corresponding to "forever21.com", seed trie 300 comprises node 315 corresponding to "fo" based on a branch for the letter "o" in the domain name. Seed trie 300 comprises further nodes for each letter in "forever21.com" until the branch reaches the terminal node 320 corresponding to the full domain name. Similarly, for the branch corresponding to "pythonhosted.org", seed trie 300 comprises seed trie 300 comprises node 330 corresponding to "py" based on a branch for the letter "y" in the domain name. Seed trie 300 comprises further nodes for each letter in "pythonhosted.org" until the branch reaches the terminal node 335 corresponding to the full domain name.

Figure 4A:
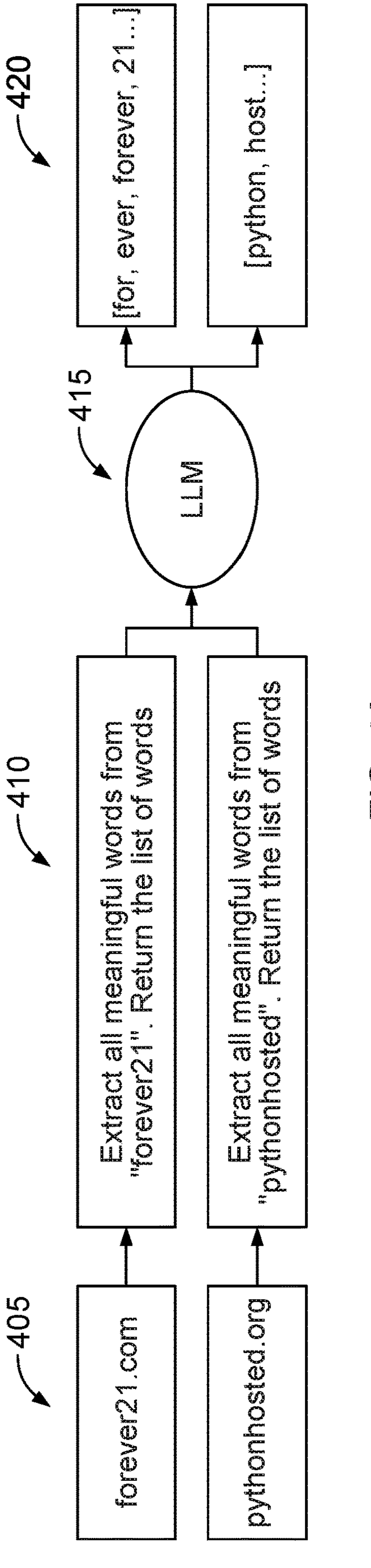
FIGS. 4A and 4B are examples of prompts to a large language model (LLM) to query the LLM.
Figure 4B:
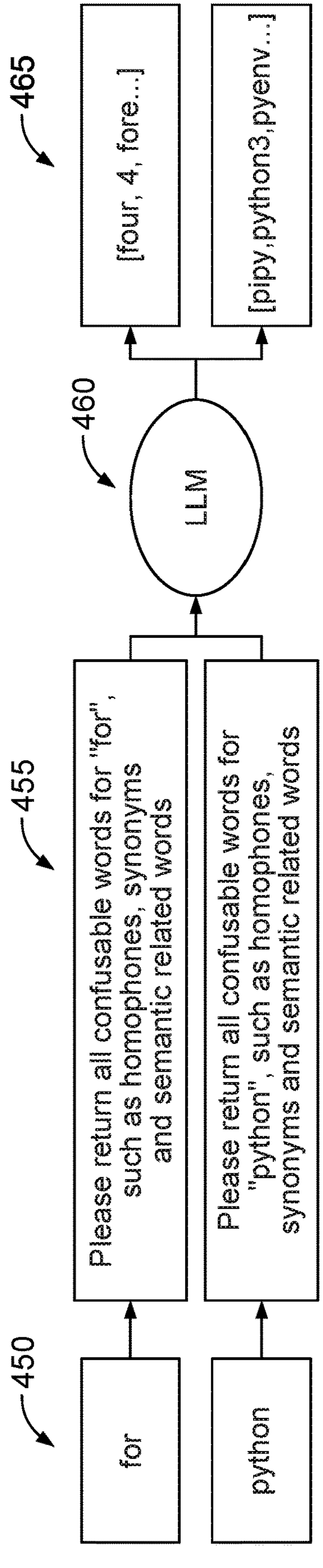

FIGS. 4A and 4B are examples of prompts to a large language model (LLM) to query the LLM.

In the example shown in FIG. 4A, the system obtains domain 405 corresponding to forever21.com. The system generates a prompt 410 to be used to prompt the LLM 415 for a set of meaningful words. As an example, prompt 410 may be "[extract] all meaningful words from 'forever21'. Return the list of words". In some embodiments, the system can configure prompt 410 to specify a syntax or format for the output of the list of meaningful words. The system obtains output 420 from the LLM 415. The output 420 includes a set of meaningful words in the domain 405, namely [for, ever, forever, 21, . . . ].

In the example shown in FIG. 4B, the system obtains a set of key words, such as a set of meaningful words extracted from an input domain or a seed domain. The system obtains key word 450 and generates a prompt 455 to be used to prompt LLM 460 for a set of related or confusable words. As an illustrative example, prompt 455 may be "[please] return all confusable words for "for" such as homophones, synonyms, and semantic related words." In some embodiments, the system can configure prompt 455 to specify a syntax or format for the output of the list of confusable or related words. The system prompts LLM 450 based on prompt 455 and obtains from LLM 450 the output 465. The output 465 includes a set of confusable words or related words for key word 450, namely [four, 4, fore, . . . ].

Figure 5:
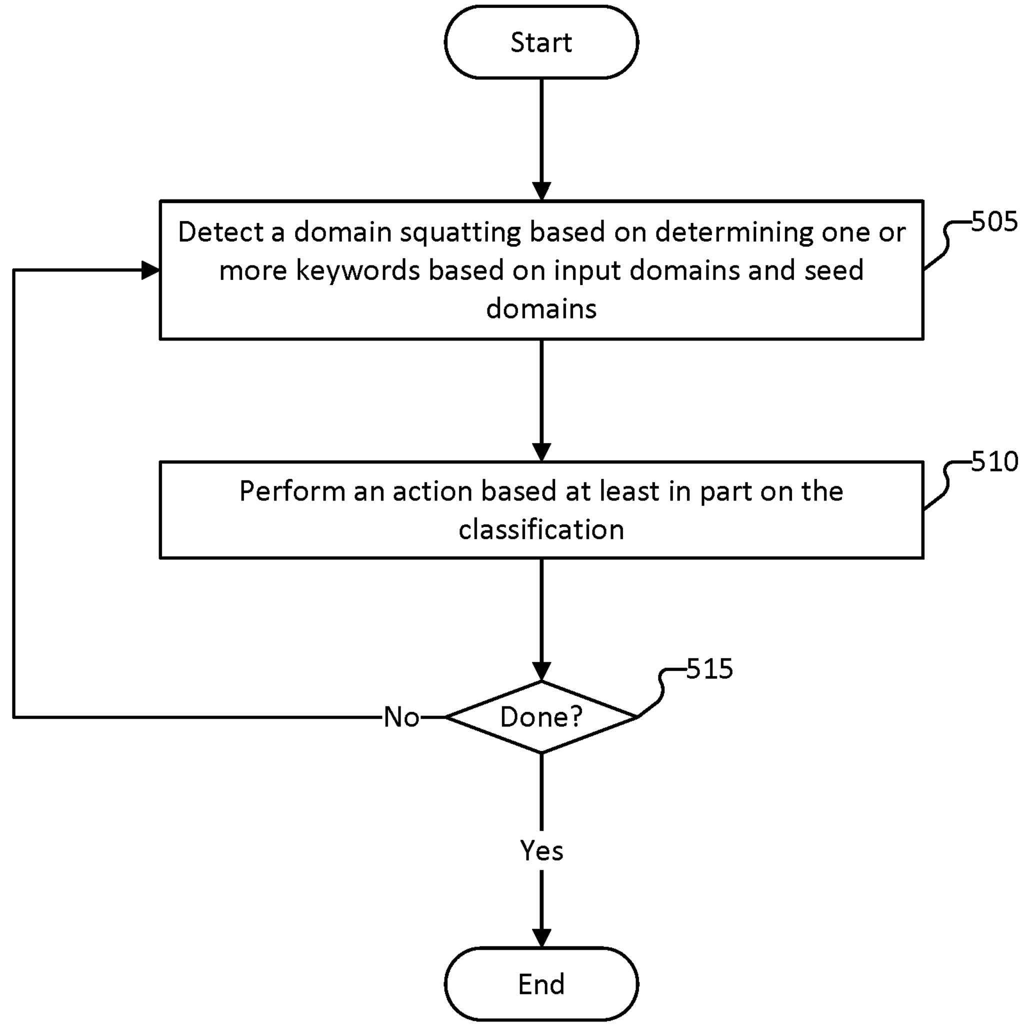
FIG. 5 is a flow diagram of a method for detecting domain squatting according to various embodiments.

FIG. 5 is a flow diagram of a method for detecting domain squatting according to various embodiments. According to various embodiments, process 500 is implemented at least in part by one or more of system 100 of FIG. 1 and/or system 200 of FIG. 2.

In some embodiments, process 500 is implemented by a cloud service (e.g., one or more servers) that provides squatting domain classification services and/or other network security services to various network endpoints or security entities. For example, the system may implement process 500 to perform offline detections of squatting domains. As another example, the system may implement process 500 contemporaneous with interception/handling of network traffic (e.g., DNS traffic). An inline security entity provides to the system an intercepted network traffic sample (e.g., DNS traffic sample) for a real-time (e.g., near real-time) classification and the system implements process 500 contemporaneous with the security entity's handling of the network traffic.

At 505, the system detects a domain squatting based on determining one or more keywords based on input domains and seed domains. At 510, the system performs an action based at least in part on the classification. At 515, a determination is made as to whether process 500 is complete. In some embodiments, process 500 is determined to be complete in response to a determination that no further samples are to be analyzed (e.g., no further predictions for traffic are needed), no further traffic is to be classified, no further network traffic is received, an administrator indicates that process 500 is to be paused or stopped, etc. In response to a determination that process 500 is complete, process 500 ends. In response to a determination that process 500 is not complete, process 500 returns to 505.

Figure 6:
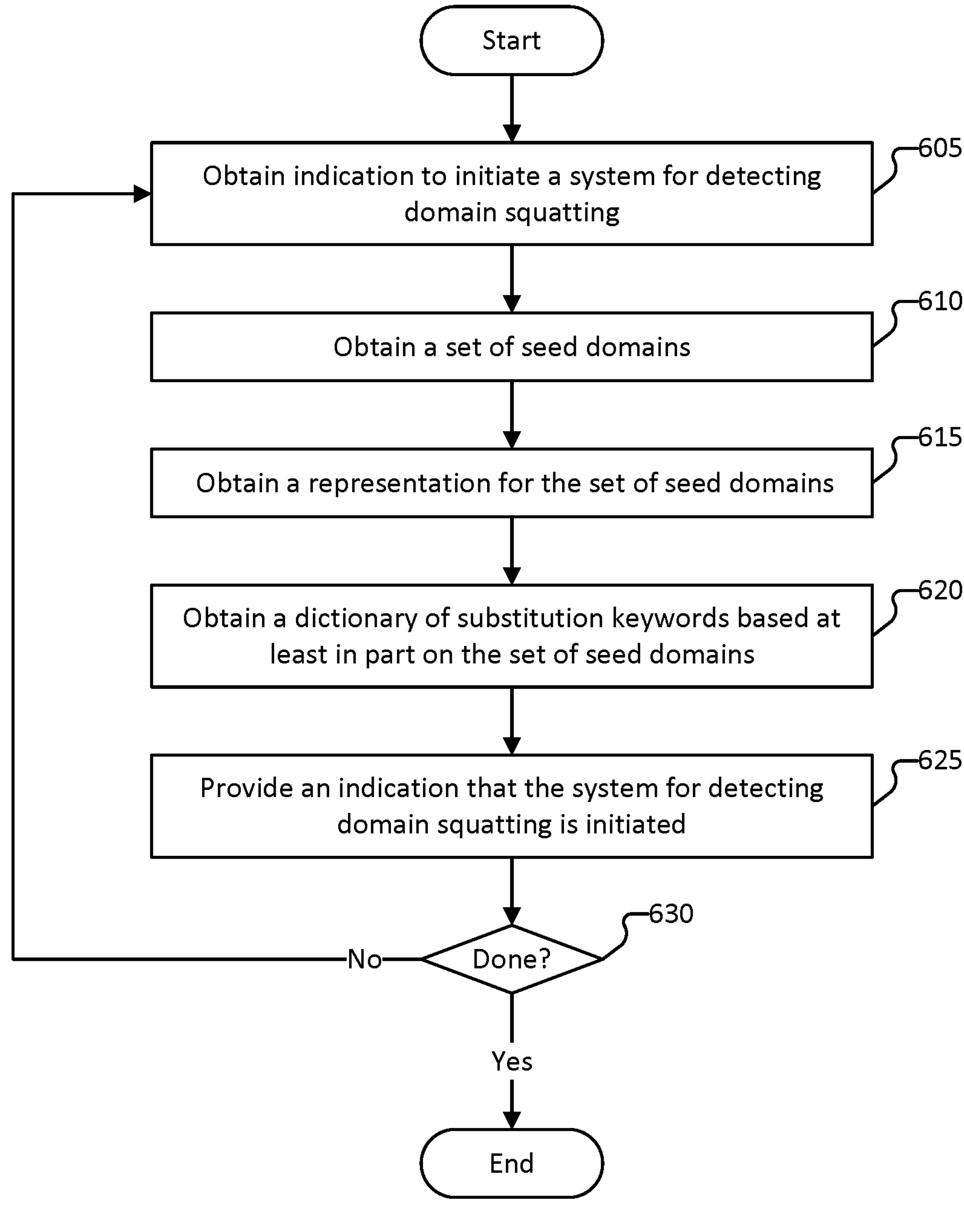
FIG. 6 is a flow diagram of a method for initiating a system for detecting domain squatting according to various embodiments.

FIG. 6 is a flow diagram of a method for initiating a system for detecting domain squatting according to various embodiments. According to various embodiments, process 600 is implemented at least in part by one or more of system 100 of FIG. 1 and/or system 200 of FIG. 2.

In some embodiments, process 600 is implemented by a cloud service (e.g., one or more servers) that provides squatting domain classification services and/or other network security services to various network endpoints or security entities. For example, the system may implement process 600 to perform offline detections of squatting domains. As another example, the system may implement process 600 contemporaneous with interception/handling of network traffic (e.g., DNS traffic). An inline security entity provides to the system an intercepted network traffic sample (e.g., DNS traffic sample) for a real-time (e.g., near real-time) classification and the system implements process 600 contemporaneous with the security entity's handling of the network traffic.

At 605, the system obtains an indication to initiate a system for detecting domain squatting. At 610, the system obtains a set of seed domains. In some embodiments, the set of seed domains corresponds a set of predefined domains. The set of seed domains may comprise domains that are deemed popular. For example, the set of seed domains may comprise the top 1000 domains or other list of popular domains published by a third party service, etc. Additionally, or alternatively, the set of seed domains comprises domains of interest to the service. For example, the set of seed domains comprises domains for a customer of a security service and/or such other domains that a security service administrator or a customer administrator may predefined. At 615, the system obtains a representation for the seed domains. In some embodiments, the system invokes process 800 in connection with obtaining the representation for the seed domains. At 620, the system obtains a dictionary of substitution keywords based at least in part on the set of seed domains. In some embodiments, the system invokes process 700 in connection with obtaining the representation for the seed domains. At 625, the system provides an indication that the system for detecting domain squatting is initiated. At 630, a determination is made as to whether process 600 is complete. In some embodiments, process 600 is determined to be complete in response to a determination that no further samples are to be analyzed (e.g., no further predictions for traffic are needed), no further traffic is to be classified, no further network traffic is received, no further domain squatting detections are to be obtained, an administrator indicates that process 600 is to be paused or stopped, etc. In response to a determination that process 600 is complete, process 600 ends. In response to a determination that process 600 is not complete, process 600 returns to 605.

Figure 7:
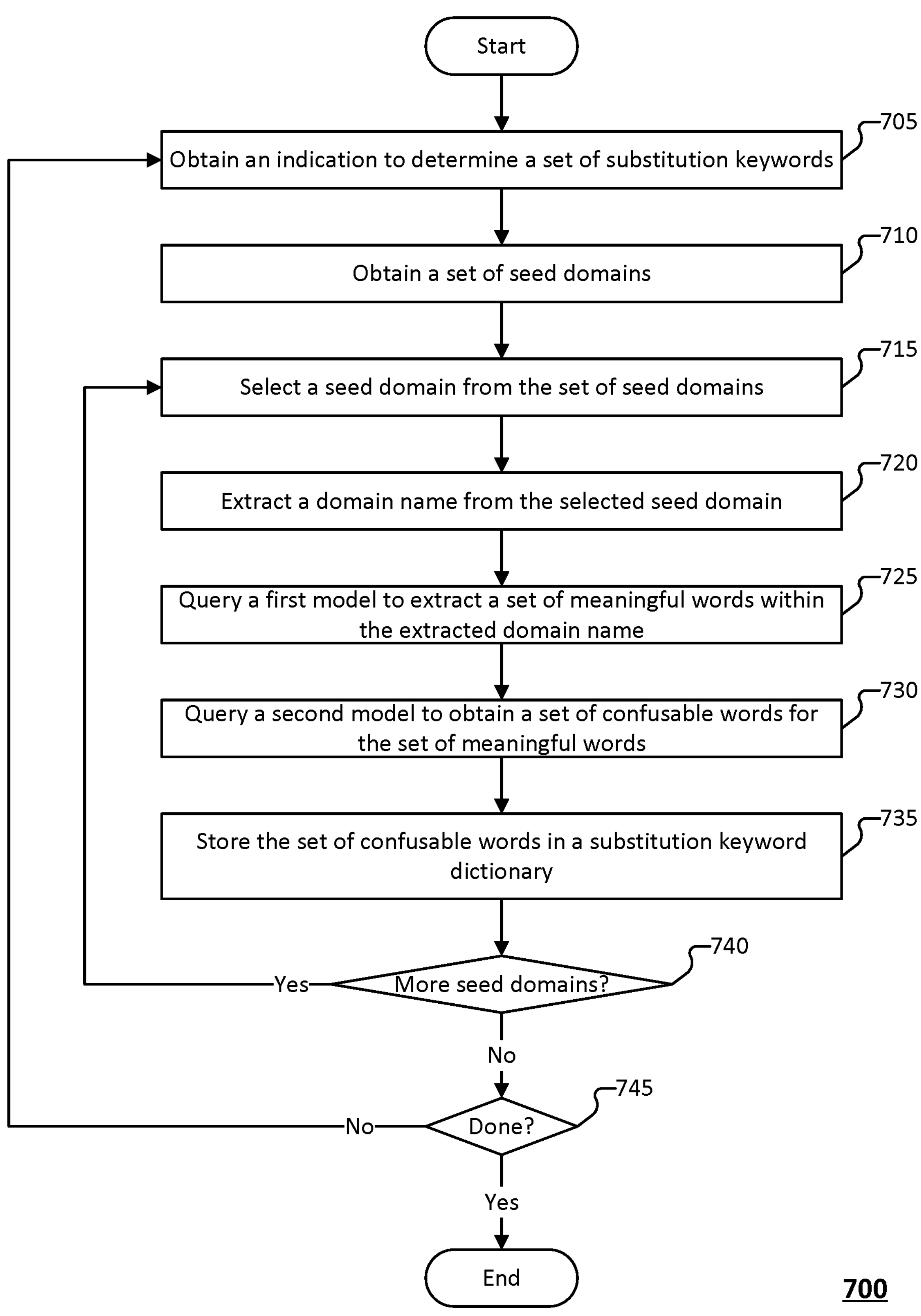
FIG. 7 is a flow diagram of a method for determining a substitution keyword dictionary according to various embodiments.

FIG. 7 is a flow diagram of a method for determining a substitution keyword dictionary according to various embodiments. According to various embodiments, process 700 is implemented at least in part by one or more of system 100 of FIG. 1 and/or system 200 of FIG. 2.

In some embodiments, process 700 is implemented by a cloud service (e.g., one or more servers) that provides squatting domain classification services and/or other network security services to various network endpoints or security entities. For example, the system may implement process 700 to perform offline detections of squatting domains. As another example, the system may implement process 700 contemporaneous with interception/handling of network traffic (e.g., DNS traffic). An inline security entity provides to the system an intercepted network traffic sample (e.g., DNS traffic sample) for a real-time (e.g., near real-time) classification and the system implements process 700 contemporaneous with the security entity's handling of the network traffic.

In some embodiments, process 700 is invoked by process 600, such as at 620.

At 705, the system obtains an indication to determine a set of substitution key words. At 710, the system obtains a set of seed domains. At 715, the system selects a seed domain from the set of seed domains. At 720, the system extracts a domain name from the selected seed domain. At 725, the system queries a first model to extract a set of meaningful words within the extracted domain name. As an illustrative example, if the domain name is forever21.com, the system extracts "forever" and "21" from the domain name. In some embodiments, the first model is a machine learning model. The machine learning model may be an LLM. Various LLMs may be implemented, for example, ChatGPT, Claude, Grok, Gemini, Llama, etc. At 730, the system queries a second model to obtain a set of consumable words for the set of meaningful words. For example, the system queries the second model to provide consumable words for each of the meaningful words extracted from the domain name of the selected seed domain. In some embodiments, the first model and the second model are implemented by the same model (e.g., the same LLM). In some embodiments, the second model is a machine learning model. The machine learning model may be an LLM. Various LLMs may be implemented, for example, ChatGPT, Claude, Grok, Gemini, Llama, etc. At 735, the system stores the set of confusable words in a substitution keyword dictionary. At 740, the system determines whether any other seed domains are to be processed. For example, the system determines whether the set of seed domains comprises any further seed domains for which the set of confusable words for the set of meaningful words are to be determined. In response to determining that another seed domain is to be processed/evaluated, process 700 returns to 715 and process 700 iterates over 715-740 until no further seed domains are to be processed/evaluated. Conversely, in response to determining that no further seed domains are to be processed/evaluated, process 700 proceeds to 745. At 745, a determination is made as to whether process 700 is complete. In some embodiments, process 700 is determined to be complete in response to a determination that no further substitution keywords are to be determined, no further seed domains are to be evaluated, no further domain squatting detections are to be obtained, an administrator indicates that process 700 is to be paused or stopped, etc. In response to a determination that process 700 is complete, process 700 ends. In response to a determination that process 700 is not complete, process 700 returns to 705.

Figure 8:
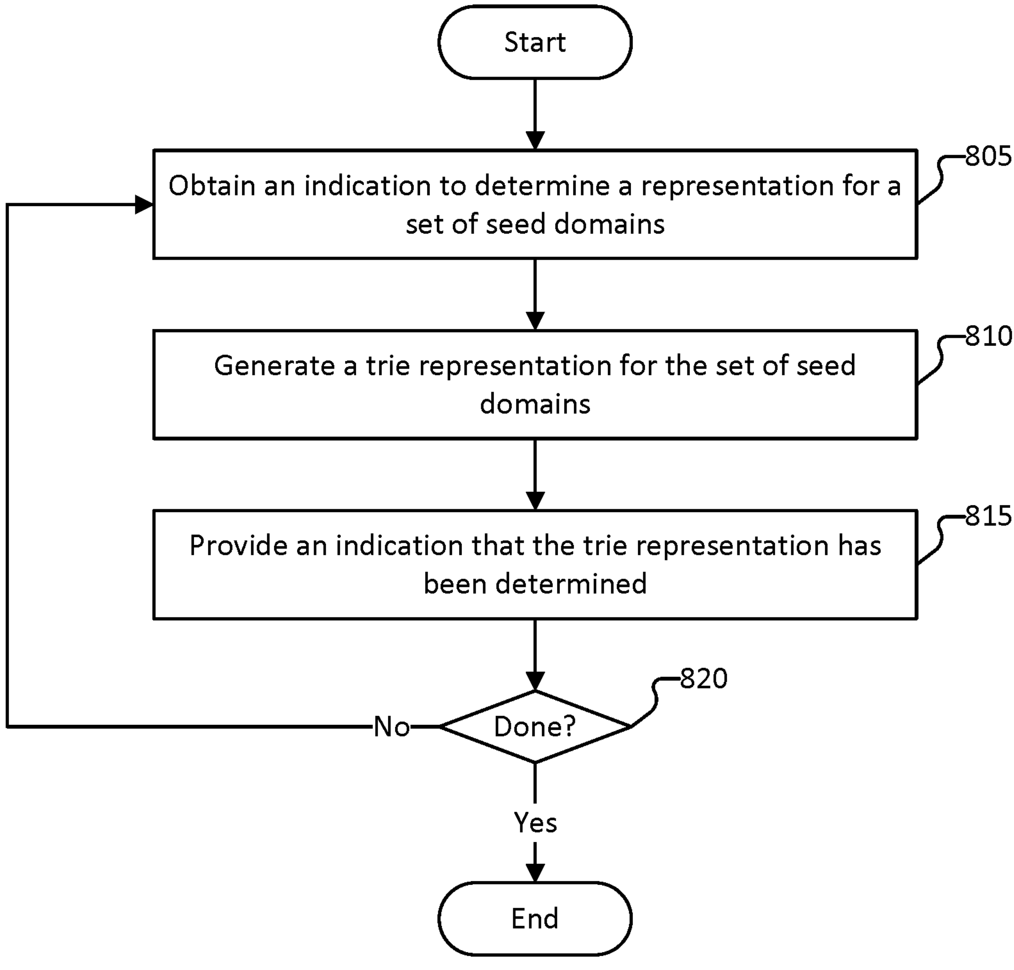
FIG. 8 is a flow diagram of a method for determining a seed trie for a set of seed domains according to various embodiments.

FIG. 8 is a flow diagram of a method for determining a seed trie for a set of seed domains according to various embodiments. According to various embodiments, process 800 is implemented at least in part by one or more of system 100 of FIG. 1 and/or system 200 of FIG. 2.

In some embodiments, process 800 is implemented by a cloud service (e.g., one or more servers) that provides squatting domain classification services and/or other network security services to various network endpoints or security entities. For example, the system may implement process 800 to perform offline detections of squatting domains. As another example, the system may implement process 800 contemporaneous with interception/handling of network traffic (e.g., DNS traffic). An inline security entity provides to the system an intercepted network traffic sample (e.g., DNS traffic sample) for a real-time (e.g., near real-time) classification and the system implements process 800 contemporaneous with the security entity's handling of the network traffic.

In some embodiments, process 800 is invoked by process 600, such as at 615.

At 805, the system obtains an indication to determine a representation for a set of seed domains. At 810, the system generates a trie representation for the set of seed domains. At 815, the system provides an indication that the trie representation has been determined. At 820, a determination is made as to whether process 800 is complete. In some embodiments, process 800 is determined to be complete in response to a determination that no further seed domains are to be evaluated/processed, the generation of the trie has been completed, no further domain squatting detections are to be obtained, an administrator indicates that process 800 is to be paused or stopped, etc. In response to a determination that process 800 is complete, process 800 ends. In response to a determination that process 800 is not complete, process 800 returns to 805.

Figure 9:
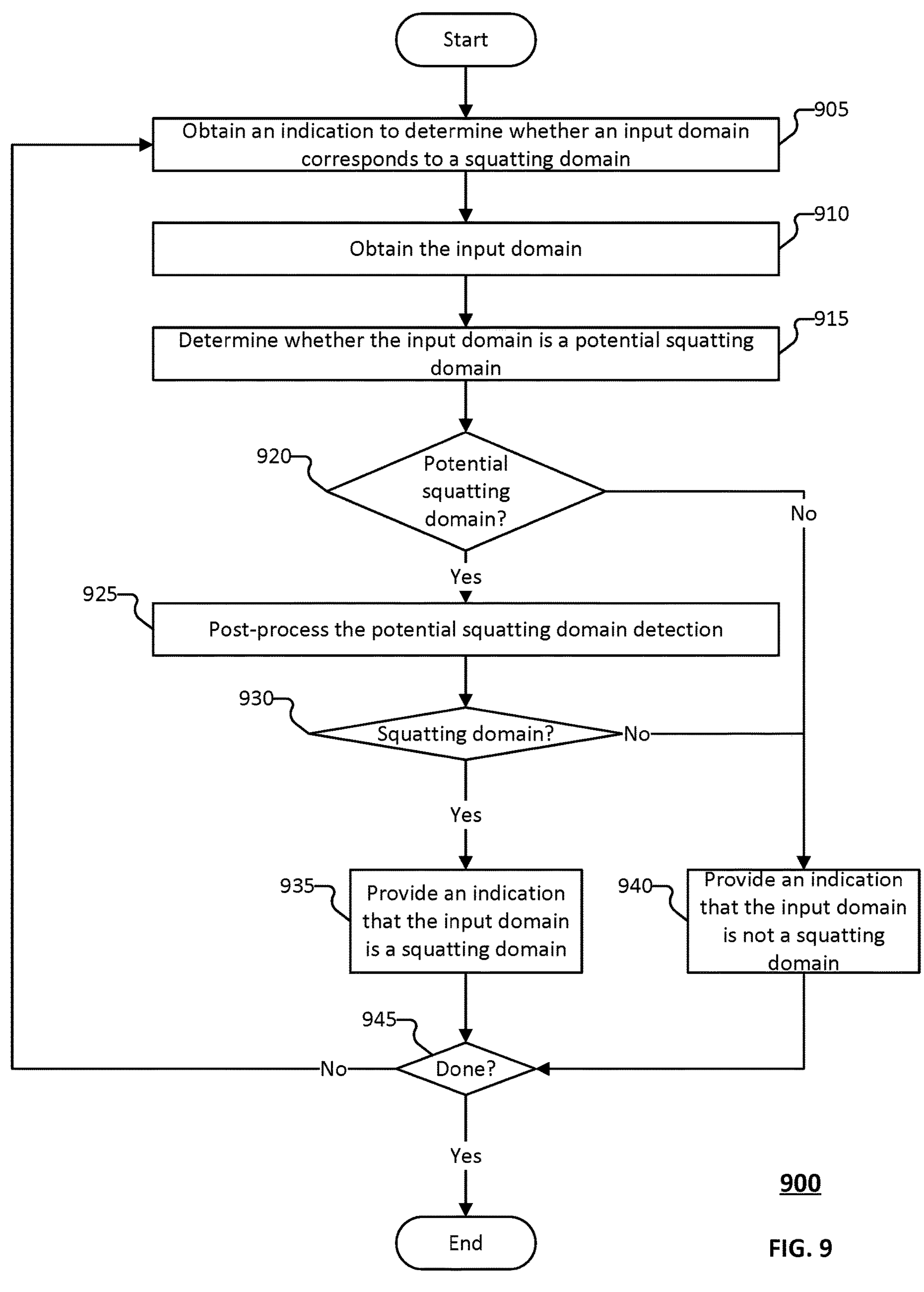
FIG. 9 is a flow diagram of a method for detecting domain squatting according to various embodiments.

FIG. 9 is a flow diagram of a method for detecting domain squatting according to various embodiments. According to various embodiments, process 900 is implemented at least in part by one or more of system 100 of FIG. 1 and/or system 200 of FIG. 2.

In some embodiments, process 900 is implemented by a cloud service (e.g., one or more servers) that provides squatting domain classification services and/or other network security services to various network endpoints or security entities. For example, the system may implement process 900 to perform offline detections of squatting domains. As another example, the system may implement process 900 contemporaneous with interception/handling of network traffic (e.g., DNS traffic). An inline security entity provides to the system an intercepted network traffic sample (e.g., DNS traffic sample) for a real-time (e.g., near real-time) classification and the system implements process 900 contemporaneous with the security entity's handling of the network traffic.

At 905, the system obtains an indication to determine whether an input domain corresponds to a squatting domain. At 910, the system obtains the input domain. For example, the input domain corresponds to the domain for which a squatting domain classification/detection is to be implemented. For example, the input domain corresponds to a domain associated with an intercepted network traffic sample. At 915, the system determines whether the input domain is a potential squatting domain. In some embodiments, the system invokes process 1000 of FIG. 10 in connection with determining whether the input domain is a potential squatting domain. The system can determine whether the input domain matches a potential squatting domain based on determining whether a variant of the input domain using the meaningful words extracted from the domain name of the input domain and a set of confusable words for the meaningful words. At 920, the system determines whether the result indicates that the input domain is a potential squatting domain. In response to determining that the input domain is not a potential squatting domain, process 900 proceeds to 940 at which the system provides an indication that the input domain is not a squatting domain. In some embodiments, the system provides the indication to another system, process, or service that invoked process 900. Conversely, in response to determining that the input domain is a potential squatting domain, process 900 proceeds to 925 at which the system post-processes the potential squatting domain detection. In some embodiments, the system invokes process 1100 and/or 1200 to post process the potential squatting domain detection (e.g., the classification that the input domain is a potential squatting domain). At 930, the system determines whether the input domain is a squatting domain. For example, the system determines whether the result from post-processing the potential squatting domain detection indicates that the input domain is a squatting domain (e.g., whether the potential squatting domain detection is a true positive). In response to determining that the input domain is a squatting domain, process 900 proceeds to 935 at which the system provides an indication that the input domain is a squatting domain. In response to determining that the input domain is not a squatting domain, process 900 proceeds to 940. At 945, a determination is made as to whether process 900 is complete. In some embodiments, process 900 is determined to be complete in response to a determination that no further network traffic is to be classified, no further domain squatting detections are to be obtained, an administrator indicates that process 900 is to be paused or stopped, etc. In response to a determination that process 900 is complete, process 900 ends. In response to a determination that process 900 is not complete, process 900 returns to 905.

Figure 10:
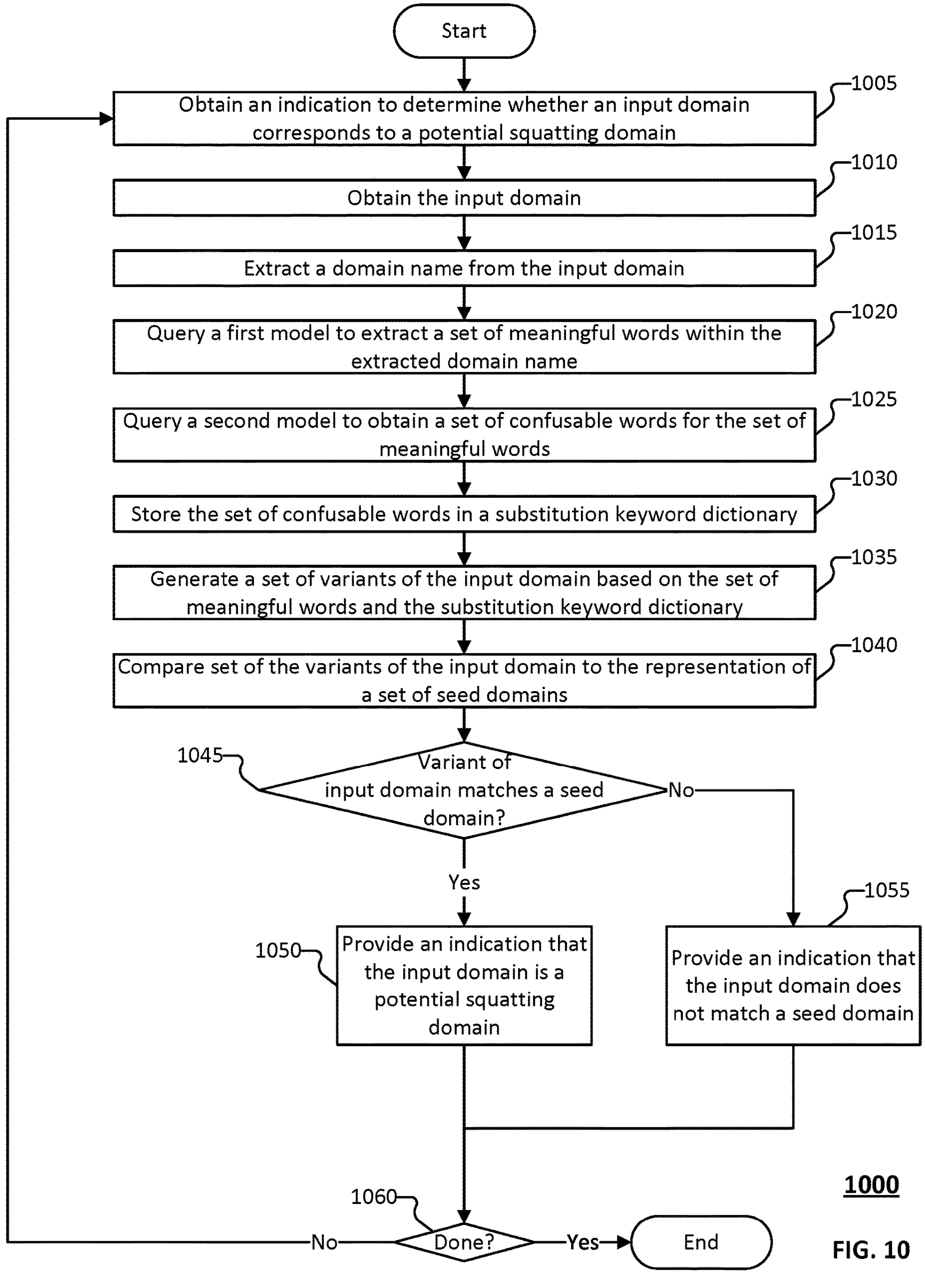
FIG. 10 is a flow diagram of a method for detecting potential squatting domains according to various embodiments.

FIG. 10 is a flow diagram of a method for detecting potential squatting domains according to various embodiments. According to various embodiments, process 1000 is implemented at least in part by one or more of system 100 of FIG. 1 and/or system 200 of FIG. 2.

In some embodiments, process 1000 is implemented by a cloud service (e.g., one or more servers) that provides squatting domain classification services and/or other network security services to various network endpoints or security entities. For example, the system may implement process 1000 to perform offline detections of squatting domains. As another example, the system may implement process 1000 contemporaneous with interception/handling of network traffic (e.g., DNS traffic). An inline security entity provides to the system an intercepted network traffic sample (e.g., DNS traffic sample) for a real-time (e.g., near real-time) classification and the system implements process 1000 contemporaneous with the security entity's handling of the network traffic.

At 1005, the system obtains an indication to determine whether an input domain corresponds to a potential squatting domain. For example, the system determines to perform a squatting domain classification with respect to an intercepted network traffic sample (e.g., a NDS request, a DNS response, etc.). As another example, the system may receive the indication based on a request or determination that an offline squatting domain classification is to be performed with respect to one or more input domains. At 1010, the system obtains the input domain. At 1015, the system extracts a domain name from the input domain. At 1020, the system queries a first model to extract a set of meaningful words within the extracted domain name. In some embodiments, 1020 is the same as, or similar to, 725 of process 700. At 1025, the system queries a second model to obtain a set of confusable words for the set of meaningful words. In some embodiments, 1020 is the same as, or similar to, 730 of process 700. As an example, the same LLM may implement the first model and the second model. At 1030, the system stores the set of confusable words in a substitution keyword dictionary. At 1035, the system generates a set of variants of the input domain based on the set of meaningful words and the substitution keyword dictionary. At 1040, the system compares the set of variants of the input domain to the representation of a set of seed domains. In some embodiments, the system invokes process 1300 in connection with the comparing the set of variants of the input domain to the representation of the seed domains to obtain a comparison result (e.g., an indication of whether the input domain or any variants matches a seed domain). At 1045, the system determines whether a variant of the input domain matches a seed domain. In response to determining that a variant of the input domain matches a seed domain, process 1000 proceeds to 1050 at which the system provides an indication that the input domain is a potential squatting domain. The system may provide the indication to the system, service, or process that invoked process 1000. In response to determining that a variant of the input domain does not match a seed domain, process 1000 proceeds to 1055 at which the system provides an indication that the input domain does not match a seed domain. For example, the system provides an indication that the input domain is not classified as a squatting domain. The system may provide the indication to the system, service, or process that invoked process 1000. At 1060, a determination is made as to whether process 1000 is complete. In some embodiments, process 1000 is determined to be complete in response to a determination that no further network traffic is to be classified, no further domain squatting detections are to be obtained, an administrator indicates that process 1000 is to be paused or stopped, etc. In response to a determination that process 1000 is complete, process 1000 ends. In response to a determination that process 1000 is not complete, process 1000 returns to 1005.

Figure 11:
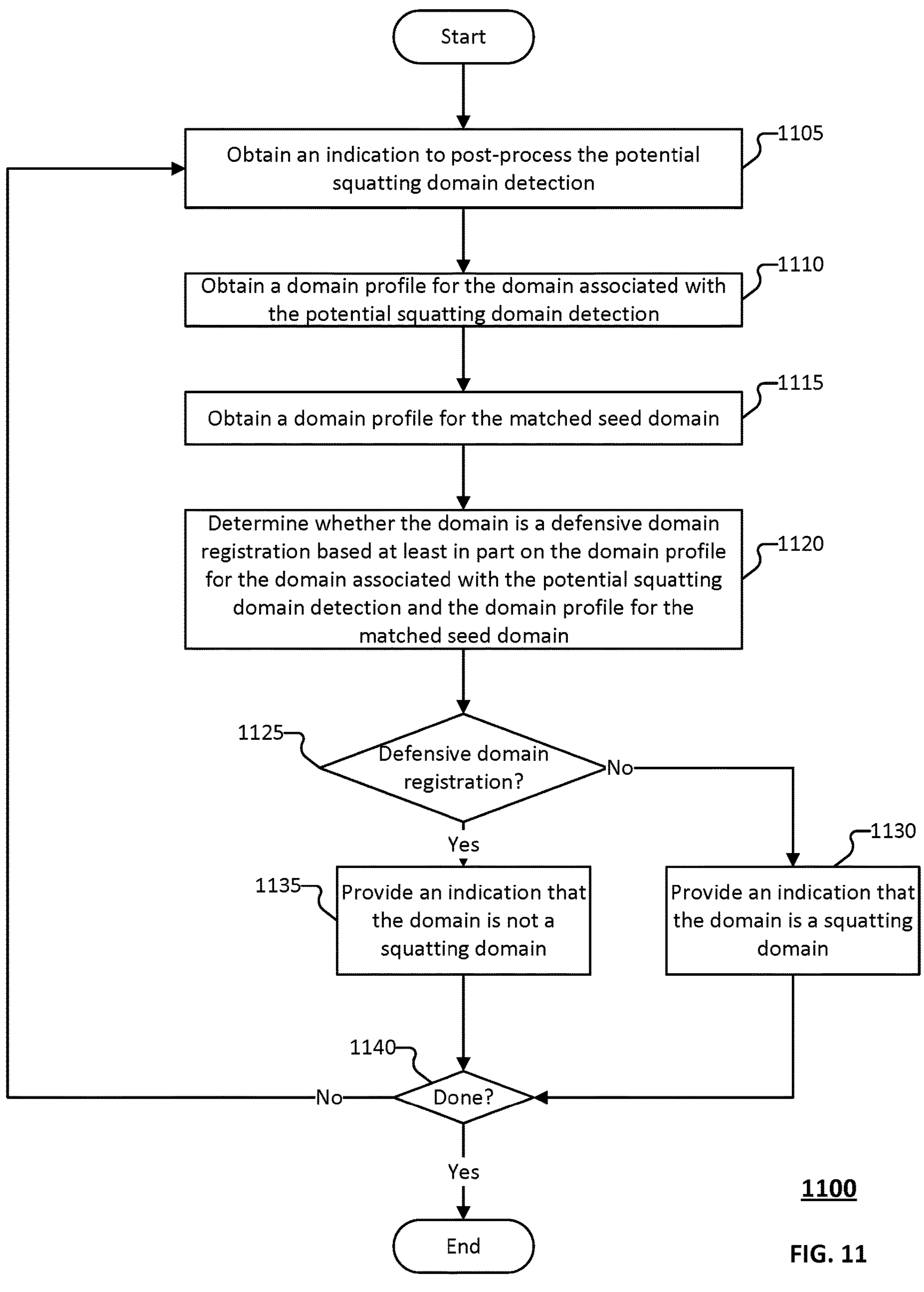
FIG. 11 is a flow diagram of a method for determining whether a potential squatting domain is a squatting domain according to various embodiments.

FIG. 11 is a flow diagram of a method for determining whether a potential squatting domain is a squatting domain according to various embodiments. According to various embodiments, process 1300 is implemented at least in part by one or more of system 100 of FIG. 1 and/or system 200 of FIG. 2.

In some embodiments, process 1300 is implemented by a cloud service (e.g., one or more servers) that provides squatting domain classification services and/or other network security services to various network endpoints or security entities. For example, the system may implement process 1300 to perform offline detections of squatting domains. As another example, the system may implement process 1300 contemporaneous with interception/handling of network traffic (e.g., DNS traffic). An inline security entity provides to the system an intercepted network traffic sample (e.g., DNS traffic sample) for a real-time (e.g., near real-time) classification and the system implements process 1300 contemporaneous with the security entity's handling of the network traffic.

In some embodiments, process 1100 is invoked by 925 of process 900.

In some embodiments, process 1100 is implemented in connection with determining whether the candidate domain (e.g., an input domain) is indeed a squatting domain.

In some embodiments, process 1100 is implemented in connection with determining whether the input domain associated with a potential squatting domain detection is indeed a squatting domain. For example, the system invokes process 1100 for an input domain if a variant of the input domain was deemed to match a seed domain (e.g., the variant matched an entry in the seed trie).

At 1105, the system obtains an indication to post-process the potential squatting domain detection. For example, the system obtains an indication that the system is to determine whether a potential squatting domain detection is accurate (e.g., whether the detection is a false positive or a true positive). At 1110, the system obtains a domain profile for the domain associated with the potential squatting domain detection (e.g., the input domain, for example, the input domain for a variant of the input domain that is determined to match a seed domain in the seed trie). For example, the domain profile comprises information pertaining to the domain registrar, domain registrant information, IP address, name server, etc. Various other types of domain information may be implemented in the domain profile. As an example, the domain registrant information is obtained from a corresponding WHOIS record. As another example, the IP address and/or name server is obtained based on passive DNS data for the input domain. At 1115, the system obtains a domain profile for the matched seed domain. At 1120, the system determines whether the domain (e.g., the input domain) is a defensive domain registration based at least in part on the domain profile for the input domain and the domain profile for the matched seed domain. In some embodiments, the system invokes process 1200 to determine whether the potential squatting domain detection is a true positive or false positive, or alternatively, whether the potential squatting domain detection corresponds to a defensive registration that is made by or for an owner of the legitimate domain. At 1125, the system determines whether a result of 1120 indicates that the potential squatting domain detection is a defensive domain registration. In response to determining that the domain (e.g., the input domain) is a defensive domain registration, process 1100 proceeds to 1135 at which the system provides an indication that the domain (e.g., the input domain) is not a squatting domain. In response to determining that the domain (e.g., the input domain) is not a defensive domain registration, process 1100 proceeds to 1140 at which the system provides an indication that the domain (e.g., the input domain) is a squatting domain. In some embodiments, the system provides the indication(s) to a system, service, or process that invoked process 1100 (e.g., to 925 of process 900). At 1140, a determination is made as to whether process 1100 is complete. In some embodiments, process 1100 is determined to be complete in response to a determination that no further network traffic is to be classified, no further potential squatting domain detections are to be evaluated/post-processed, no further domain squatting detections are to be obtained, an administrator indicates that process 1100 is to be paused or stopped, etc. In response to a determination that process 1100 is complete, process 1100 ends. In response to a determination that process 1100 is not complete, process 1100 returns to 1105.

Figure 12:
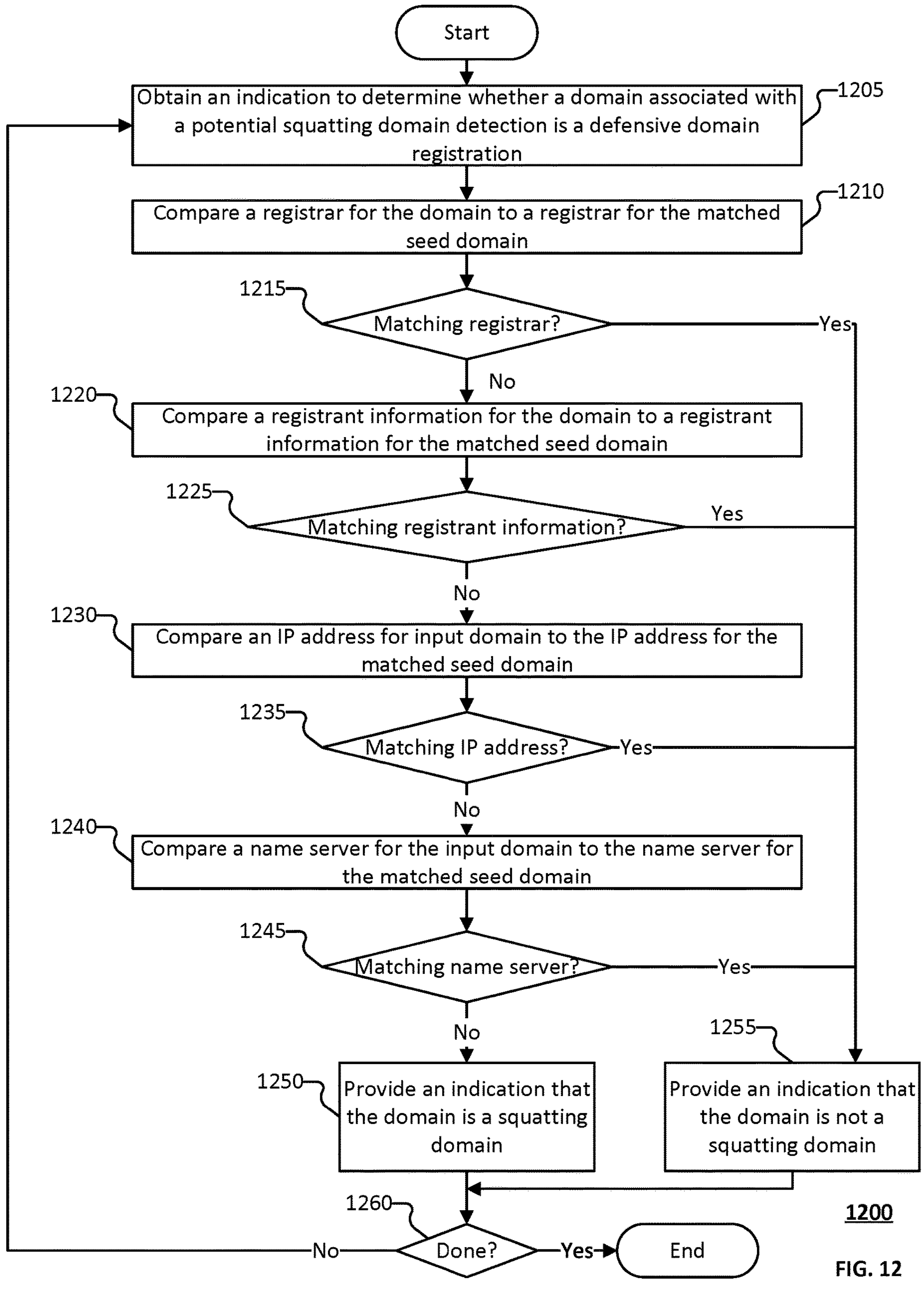
FIG. 12 is a flow diagram of a method for determining whether a potential squatting domain is a squatting domain according to various embodiments.

FIG. 12 is a flow diagram of a method for determining whether a potential squatting domain is a squatting domain according to various embodiments. According to various embodiments, process 1200 is implemented at least in part by one or more of system 100 of FIG. 1 and/or system 200 of FIG. 2.

In some embodiments, process 1200 is implemented by a cloud service (e.g., one or more servers) that provides squatting domain classification services and/or other network security services to various network endpoints or security entities. For example, the system may implement process 1200 to perform offline detections of squatting domains. As another example, the system may implement process 1200 contemporaneous with interception/handling of network traffic (e.g., DNS traffic). An inline security entity provides to the system an intercepted network traffic sample (e.g., DNS traffic sample) for a real-time (e.g., near real-time) classification and the system implements process 1200 contemporaneous with the security entity's handling of the network traffic.

In some embodiments, a candidate domain (e.g., the domain associated with a potential squatting domain detection) is deemed to be a defensive domain registration (e.g., that the potential squatting domain detection is a false positive) if the candidate domain shares any same attribute with the matched seed domain. The system can then filter out the potential squatting domain detection.

In some embodiments, a candidate domain (e.g., the domain associated with a potential squatting domain detection) is deemed to be a defensive domain registration (e.g., that the potential squatting domain detection is a false positive) if the candidate domain shares all of the same attribute with the matched seed domain. The system can then filter out the potential squatting domain detection.

In some embodiments, process 1200 is implemented in connection with determining whether the input domain associated with a potential squatting domain detection is indeed a squatting domain. For example, the system invokes process 1200 for an input domain if a variant of the input domain was deemed to match a seed domain (e.g., the variant matched an entry in the seed trie).

In some embodiments, process 1200 is invoked by 925 of process 900.

Process 1200 is described in connection with the implementation that a potential squatting domain detection is deemed a false positive if any domain attributes for the candidate domain matches the corresponding attribute of the matched seed domain. However, a similar process may be implemented for the case that a potential squatting domain detection is deemed a false positive if all domain attributes (e.g., registrar, registrant information, IP address, name server) of the candidate domain are the same as the matched seed domain and otherwise is deemed a true positive if any one of the domain attributes does not match with the matched seed domain.

At 1205, the system obtains an indication to determine whether a domain associated with a potential squatting domain detection (e.g., the input domain or a variant of the input domain, as applicable) is a defensive domain registration. At 1210, the system compares a registrar for the domain (e.g., the candidate domain for the potential squatting domain detection) to a registrar for the matched seed domain. At 1215, the system determines whether the registrar for the domain (e.g., the candidate domain) is the same as the registrar for the matched seed domain. In response to determining that registrar for the candidate domain and the matched seed domain matches, process 1200 proceeds to 1255. In response to determining that registrar for the candidate domain and the matched seed domain does not match, process 1200 proceeds to 1220. At 1220, the system compares a registrant information for the domain (e.g., the candidate domain for the potential squatting domain detection) to a registrant information for the matched seed domain. For example, the system compares attributes in the WHOIS records for the candidate domain and the matched seed domain (e.g., to determine if any of the attributes match, or, in some embodiments, to determine if all of the attributes match). In response to determining that the registrant information for the candidate domain and the matched seed domain match, process 1200 proceeds to 1255. In response determining that the registrant information for the candidate domain and the matched seed domain do not match, process 1200 proceeds to 1230. At 1230, the system compares an IP address for the domain (e.g., the candidate domain for the potential squatting domain detection) to an IP address for the matched seed domain. In response to determining that the IP addresses for the candidate domain and the matched seed domain match, process 1200 proceeds to 1255. In response determining that the IP addresses for the candidate domain and the matched seed domain do not match, process 1200 proceeds to 1240. At 1245, the system compares a name server for the domain (e.g., the candidate domain for the potential squatting domain detection) to a name server for the matched seed domain. In response to determining that the name servers for the candidate domain and the matched seed domain match, process 1200 proceeds to 1255. In response determining that the name servers for the candidate domain and the matched seed domain do not match, process 1200 proceeds to 1250. At 1250, the system provides an indication that the input domain is a squatting domain. Conversely, at 1255, the system provides an indication that the domain is not a squatting domain. For example, the system provides an indication that the potential squatting domain detection is a false positive, or that the corresponding domain is a defensive domain registration by or for the owner of the legitimate domain (e.g., the matched seed domain). In some embodiments, the system provides the indication(s) to a system, service, or process that invoked process 1200 (e.g., to 925 of process 900). At 1260, a determination is made as to whether process 1200 is complete. In some embodiments, process 1200 is determined to be complete in response to a determination that no further network traffic is to be classified, no further potential squatting domain detections are to be evaluated/post-processed, no further domain squatting detections are to be obtained, an administrator indicates that process 1200 is to be paused or stopped, etc. In response to a determination that process 1200 is complete, process 1200 ends. In response to a determination that process 1200 is not complete, process 1200 returns to 1205.

Figure 13:
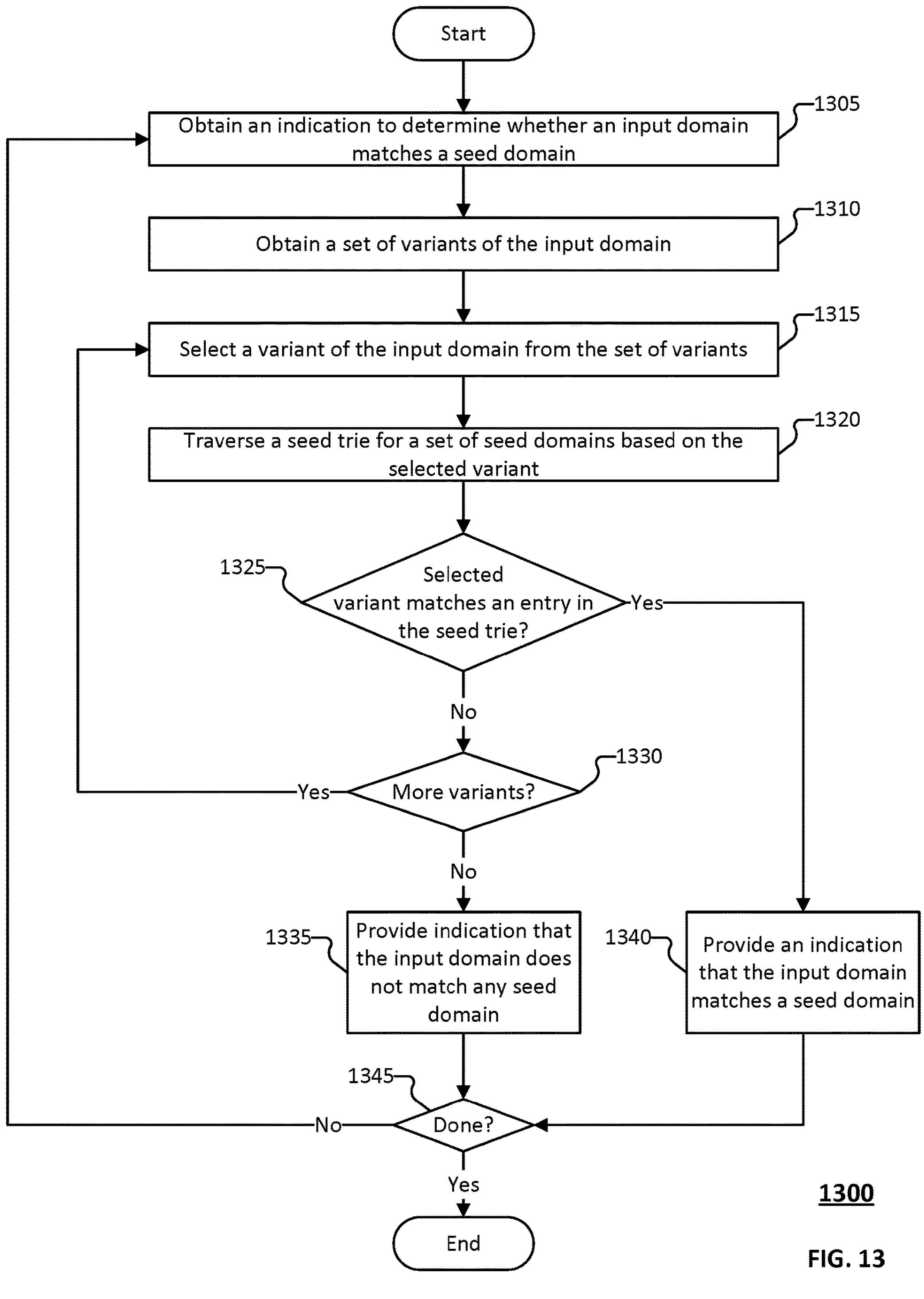
FIG. 13 is a flow diagram of a method for determining whether an input domain matches a seed domain according to various embodiments.

FIG. 13 is a flow diagram of a method for determining whether an input domain matches a seed domain according to various embodiments. According to various embodiments, process 1300 is implemented at least in part by one or more of system 100 of FIG. 1 and/or system 200 of FIG. 2.

In some embodiments, process 1300 is implemented by a cloud service (e.g., one or more servers) that provides squatting domain classification services and/or other network security services to various network endpoints or security entities. For example, the system may implement process 1300 to perform offline detections of squatting domains. As another example, the system may implement process 1300 contemporaneous with interception/handling of network traffic (e.g., DNS traffic). An inline security entity provides to the system an intercepted network traffic sample (e.g., DNS traffic sample) for a real-time (e.g., near real-time) classification and the system implements process 1300 contemporaneous with the security entity's handling of the network traffic.

At 1305, the system obtains an indication to determine whether an input domain matches a seed domain. At 1310, the system obtains a set of variants of the input domain. At 1315, the system selects a variant of the input domain from the set of variants. At 1320, the system traverses the seed trie (or other representation for the seed domains) for a set of seed domains based on the selected variant of the input domain. At 1325, the system determines whether the selected variant matches an entry in the seed trie. For example, as the system traverses the seed trie, the system determines whether the variant matches any entry in the seed trie. In response to determining that the selected variant matches an entry in the seed trie, process 1300 proceeds to 1340 at which the system provides an indication that the input domain matches a seed domain. In some embodiments, instead of concluding that the input domain matches the seed domain based on a single variant matches the seed domain, the system can determine that the variant of the input domain matches the seed domain and provide such an indication. In response to determining that the selected variant does not match an entry in the seed trie, process 1300 proceeds to 1330 at which the system determines whether any other variants of the input domain are to be evaluated (e.g., whether any further variants in the set of variants are to be evaluated). In response to determining that another variant is to be evaluated, process 1300 returns to 1315 and process 1300 iterates over 1315-1330. Conversely, in response to determining that no further variants are to be evaluated, process 1300 proceeds to 1335 at which the system provides an indication that the input domain does not match any seed domain. At 1345, a determination is made as to whether process 1300 is complete. In some embodiments, process 1300 is determined to be complete in response to a determination that no further network traffic is to be classified, no further input domains are to be evaluated for matching with a seed domain in a set of seed domains, an administrator indicates that process 1300 is to be paused or stopped, etc. In response to a determination that process 1300 is complete, process 1300 ends. In response to a determination that process 1300 is not complete, process 1300 returns to 1305.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

detect a domain squatting based at least in part on determining one or more substituted keywords based on input domains and seed domains to generate a plurality of potential squatting domains; and perform an action in response to detecting the domain squatting based at least in part on the one or more substituted keywords; and a memory coupled to the one or more processors and configured to provide the one or more processors with instructions.

2. The system of claim 1, wherein the one or more substituted keywords are determined based at least in part on querying a machine learning model.

3. The system of claim 2, wherein the determining the one or more substituted keywords based on input domains and seed domains comprises:

querying a machine learning model based at least in part on the input domains and the seed domain; and obtaining the one or more substituted keywords.

4. The system of claim 3, wherein the machine learning model is a large language model (LLM).

5. The system of claim 1, wherein the one or more substitute keyword comprise one or more keywords determined based at least in part on a homophone substitution.

6. The system of claim 1, wherein the one or more substitute keyword comprise one or more keywords determined based at least in part on a semantic synonym substitution.

7. The system of claim 1, wherein the one or more substitute keyword comprise one or more keywords determined based at least in part on a related-word substitution.

8. The system of claim 1, wherein the one or more processors are further configured to:

storing the one or more substituted keywords in a dictionary.

9. The system of claim 8, wherein the dictionary is implemented as a hash map.

10. The system of claim 1, wherein the seed domains comprise one or more predefined domains.

11. The system of claim 1, wherein the seed domains comprises a set of a threshold number of most popular domains.

12. The system of claim 1, wherein the seed domains comprise a domain for which a security service is provided to detect the domain squatting.

13. The system of claim 1, wherein the one or more processors are further configured to:

obtain the seed domains;

extract domain names from the seed domains; and generate a trie representing the domain names.

14. The system of claim 1, wherein the determining the one or more substituted keywords comprises:

obtaining a set of domain names extracted from the seed domains;

querying a first machine learning model for a set of meaningful words within the set of domain names; and querying a second machine learning model for a set of confusable words based at least in part on the set of meaningful words.

15. The system of claim 14, wherein the first machine learning model and the second machine learning model are the same.

16. The system of claim 15, wherein the first machine learning model and the second machine learning model are implemented by a large language model (LLM).

17. The system of claim 14, wherein the set of confusable words are stored in a dictionary of one or more substituted keywords.

18. The system of claim 1, wherein detecting the domain squatting comprises performing a post-filtering plurality of potential squatting domains to obtain a set of detections.

19. The system of claim 18, wherein the post-filtering of detection results comprises determining whether a registration of a domain name selected from the plurality of potential squatting domains corresponds to a defensive registration on behalf of an owner of a seed domain.

20. The system of claim 19, wherein the domain name is deemed to be a defensive registration in response to determining that a registrant information for the domain name matches a registrant information for the corresponding seed domain.

21. A method, comprising:

detecting a domain squatting based at least in part on determining one or more substituted keywords based on input domains and seed domains to generate a plurality of potential squatting domains; and performing an action in response to detecting the domain squatting based at least in part on the one or more substituted keywords.

22. A computer program product embodied in a non-transitory computer readable medium and comprising computer instructions for:

detecting a domain squatting based at least in part on determining one or more substituted keywords based on input domains and seed domains to generate a plurality of potential squatting domains; and performing an action in response to detecting the domain squatting based at least in part on the one or more substituted keywords.

23. A system, comprising:

one or more processors configured to:

extract domain names from a plurality of seed domains;

construct a data representation based at least in part on the extracted domain names; and apply a machine learning model to determine one or more potential abused keyword relationships the plurality of seed domains to extract a plurality of meaningful words; and a memory coupled to the one or more processors and configured to provide the one or more processors with instructions.

24. A method, comprising:

extracting domain names from a plurality of seed domains;

constructing a data representation based at least in part on the extracted domain names; and applying a machine learning model to determine one or more potential abused keyword relationships the plurality of seed domains to extract a plurality of meaningful words.

25. A computer program product embodied in a non-transitory computer readable medium and comprising computer instructions for:

extracting domain names from a plurality of seed domains;

constructing a data representation based at least in part on the extracted domain names; and applying a machine learning model to determine one or more potential abused keyword relationships the plurality of seed domains to extract a plurality of meaningful words.

* * * * *